(12) United States Patent
Yamamoto

(10) Patent No.: US 9,833,923 B2
(45) Date of Patent: Dec. 5, 2017

(54) CUT DATA GENERATING DEVICE, METHOD OF GENERATING CUT DATA, AND NON-TRANSITORY COMPUTER READABLE STORING MEDIUM

(71) Applicant: BROTHER KOGYO KABUSHIKI KAISHA, Nagoya-shi, Aichi-ken (JP)

(72) Inventor: Satomi Yamamoto, Okazaki (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 0 days.

(21) Appl. No.: 14/867,803

(22) Filed: Sep. 28, 2015

(65) Prior Publication Data

US 2016/0094744 A1    Mar. 31, 2016

(30) Foreign Application Priority Data

Sep. 29, 2014  (JP) .................................. 2014-198365

(51) Int. Cl.
*B26F 1/38*     (2006.01)
*H04N 1/387*    (2006.01)

(52) U.S. Cl.
CPC ........... *B26F 1/3806* (2013.01); *H04N 1/387* (2013.01)

(58) Field of Classification Search
CPC combination set(s) only.
See application file for complete search history.

(56) References Cited

U.S. PATENT DOCUMENTS

| 7,054,708 | B1* | 5/2006 | Aamodt ................. B26D 5/005 700/122 |
| 2008/0117455 | A1 | 5/2008 | Tomono et al. |
| 2008/0120071 | A1* | 5/2008 | Minatogawa ........... G06T 11/60 703/1 |
| 2012/0253504 | A1 | 10/2012 | Kawaguchi et al. |
| 2014/0182463 | A1 | 7/2014 | Muto |

FOREIGN PATENT DOCUMENTS

| GB | 1104669 A | * 2/1968 | ............... B44C 1/28 |
| JP | 2008-129905 A | 6/2008 | |
| JP | 2008-129906 A | 6/2008 | |
| JP | 2012-206237 A | 10/2012 | |
| JP | 2014-124748 A | 7/2014 | |

* cited by examiner

*Primary Examiner* — Christopher D Wait
(74) *Attorney, Agent, or Firm* — K&L Gates LLP

(57) ABSTRACT

A cut data generating device includes a control device which causes the generating device to acquire data indicating a pattern, to extract outlines of plural subpatterns contained in a design, to determine the number of layers associated with the number of sheets with respect to the extracted outlines, and to determine a sequence for stacking plural layers. The control device further causes the generating device to generate an integrated outline obtained by integrating the outline of first and second subpatterns contained in the extracted outlines, to specify the outline of the first subpattern on a first layer, to generate cut data for cutting the outline of the first subpattern from a first sheet associated with the first layer and for cutting the integrated outline from a second sheet associated with the second layer, and to output the generated cut data via the communication unit to the cutting apparatus.

7 Claims, 15 Drawing Sheets

| SHEET 1 (GREEN) |
| --- |
| FEED DATA (F1x0,F1y0) |
| 1ST COORDINATE DATA (x1,y1) |
| 2ND COORDINATE DATA (x2,y2) |
| ⋮ |
| 14TH COORDINATE DATA (x14,y14) |
| STOP CODE |
| SHEET 2 (YELLOW) |
| FEED DATA (F2x0,F2y0) |
| 1ST COORDINATE DATA (x1,y1) |
| 2ND COORDINATE DATA (x2,y2) |
| ⋮ |
| 22ND COORDINATE DATA (x22,Y22) |
| END CODE |

CUT LINE DATA FOR 1ST SHEET (SUBPATTERN A)

CUT LINE DATA FOR 2ND SHEET (SUBPATTERN C)

FIG.5A

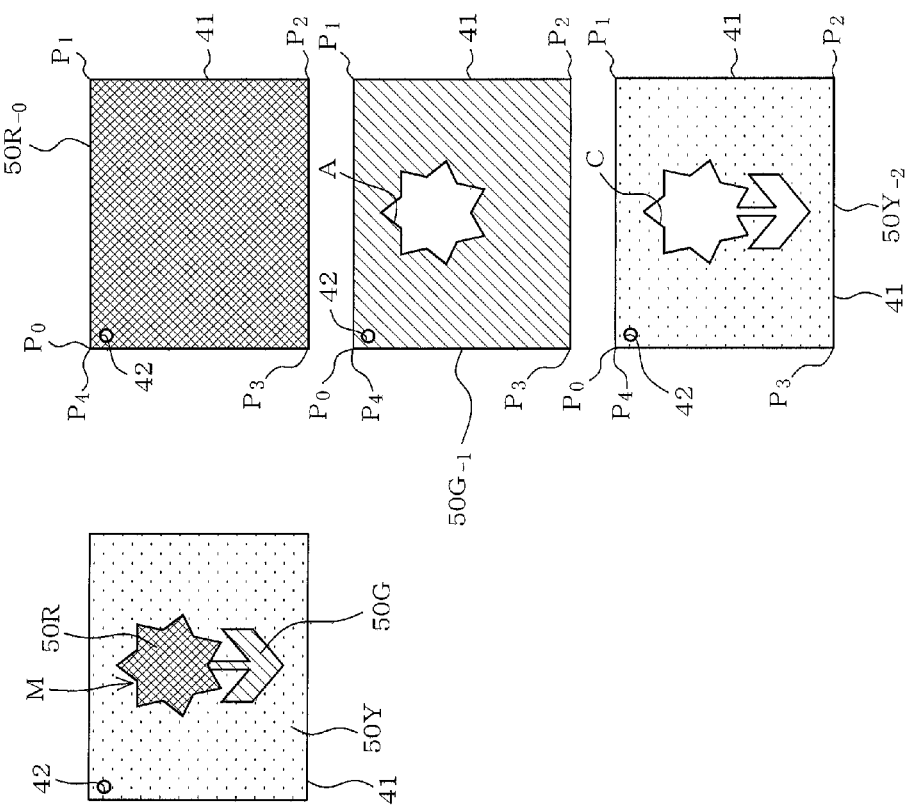

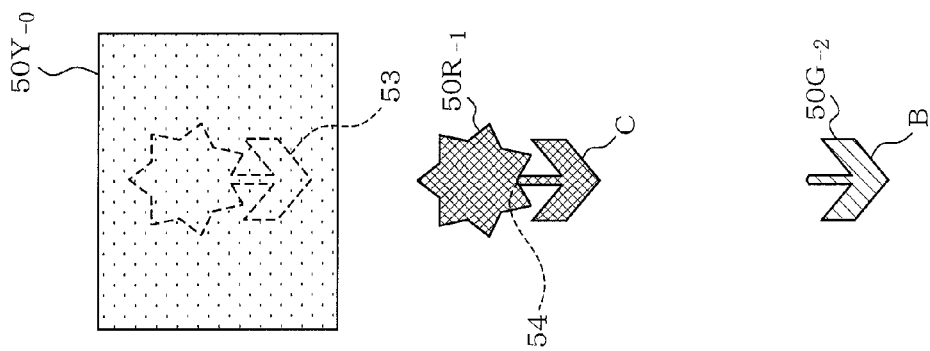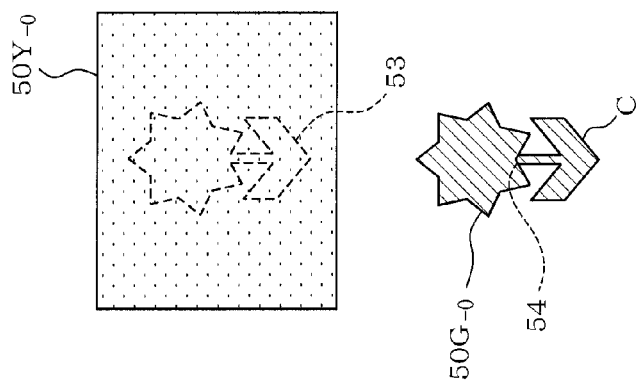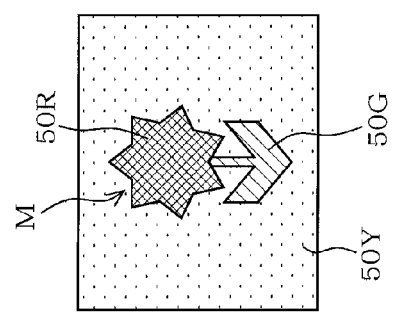

FIG.14A
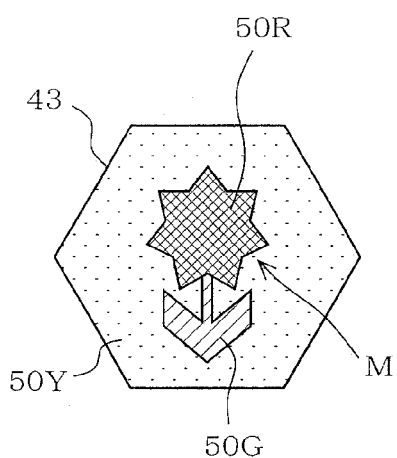
FIG.14B
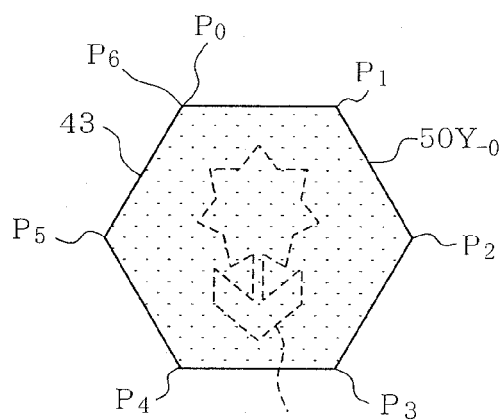
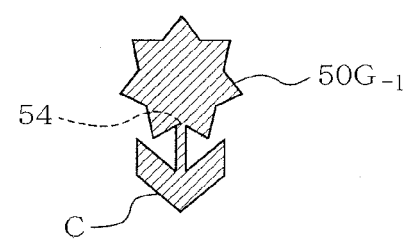
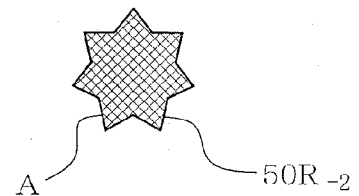

CUT DATA GENERATING DEVICE, METHOD OF GENERATING CUT DATA, AND NON-TRANSITORY COMPUTER READABLE STORING MEDIUM

CROSS-REFERENCE TO RELATED APPLICATION

This application is based upon and claims the benefit of priority from the prior Japanese Patent Application 2014-198365, filed on, Sep. 29, 2014, the entire contents of which are incorporated herein by reference.

FIELD

The disclosure relates to a cut data generating apparatus, a method of generating cut data, and a non-transitory computer readable storing medium pertaining to cut data used for cutting sheets of an embellishment formed by stacking multiple sheets.

BACKGROUND

Conventionally, there has been provided a cutting apparatus configured to automatically cut workpiece such as sheets of paper.

Such type of cutting apparatus is provided with a display for example. The user is to select a desired pattern from the choice of multiple patterns presented on the display. The workpiece sheet is attached to a holding member having an adhesive layer provided on its surface. The cutting apparatus feeds the holding member, disposed between a drive roller and a pinch roller of a drive mechanism disposed one over the other, in a first direction by clamping the edges of the holding member with the rollers. The cutting apparatus further transfers a carriage provided with a cutter in a second direction orthogonal to the first direction. The workpiece sheet is cut along the outline of the selected pattern by the above described feeding of the workpiece sheet and transferring of the carriage.

When creating an embellishment from a stack of multiple sheets, a sheet is initially prepared which serves as abase (base sheet) and a subpattern cut out from another sheet is attached to the base sheet. Then, another subpattern of a different shape is cut out from a different sheet and placed over the previous layer of subpattern. It is thus, possible to create an embellishment having a convexed pattern formed of combination of subpatterns.

The conventional cutting apparatus is capable of cutting out a desired pattern from a single sheet, but is not capable creating embellishments in the above described manner. Thus, in order to create above described types of embellishments, the user was required to manually cut out the subpatterns using scissors, etc. without using a cutting apparatus. In creating such embellishment, the user was required to determine the shape, the size, and the layout of the subpatterns to be cut from each sheet through imagination of the outcome the finished pattern.

SUMMARY

Aspects described herein provide a cut data generating apparatus, a method of generating cut data, and a non-transitory computer readable storing medium which facilitate creation of an embellishment of a desired look and feel that expresses a pattern by combining subpatterns through stacking of multiple workpiece sheets.

Aspects described herein provide cut data generating device configured to generate cut data. The cut data generating device is provide with a control device. The cut data is used for creating an embellishment indicating a pattern formed by combining plural subpatterns of different shapes. The plural subpatterns are combined by stacking plural sheets cut along an outline of the plural subpatterns. The control device is configured to: determine a sequence for stacking plural layers associated with the plural sheets, specify an outline of each subpattern to each of the plural layers in which the sequence has been determined, and generate cut data associated with each of the plural sheets based on the outline of each subpattern specified to each of the plural layers.

According to additional aspects of the disclosure, a non-transitory computer readable storing medium is provided. The medium stores computer readable instructions. The computer readable instructions are executed by a control device of a cut data generating device. The cut data generating device is configured to generate cut data used for creating an embellishment indicating a pattern formed by combining plural subpatterns of different shapes. The plural subpatterns are combined by stacking plural sheets cut along an outline of the plural subpatterns. The computer readable instructions, when executed, cause the control device to: determine a sequence for stacking plural layers associated with the plural sheets, specify an outline of each subpattern to each of the plural layers in which the sequence has been determined, and generate cut data associated with each of the plural sheets based on the outline of each subpattern specified to each of the plural layers.

According to additional aspects of the disclosure, a method of generating cut data includes determining a sequence for stacking plural sheets pertaining to the cut data, the cut data being used for creating an embellishment indicating a pattern formed by combining plural subpatterns of different shapes the plural subpatterns being combined by stacking plural sheets cut along an outline of the plural subpatterns, specifying an outline of each subpattern to each of the plural sheets in which the sequence has been determined, and generating cut data based on the outline of each subpattern specified to each of the plural sheets.

This summary is not intended to identify critical or essential features of the disclosure, but instead merely summarizes certain features and variations thereof. Other details and features will be described in the sections that follow.

BRIEF DESCRIPTION OF THE DRAWINGS

Aspects of the disclosure are illustrated by way of example, and not by limitation, in the accompanying figures in which like reference characters may indicate similar elements.

FIGS. 5A and 5B are views for explaining the data structures of first cut data and second cut data.

FIG. 7A illustrates a layer generated by the first mode and corresponds to FIG. 3A.

FIGS. 7B and 7C illustrate multiple layers generated by the first mode disposed one above another.

FIGS. 8A, 8B, and 8C illustrate layers generated by the second mode and correspond to FIGS. 7A, 7B, and 7C.

FIGS. 14A and 14B pertain to the second embodiment and correspond to FIGS. 8A and 8B.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments will be described with reference to the accompanying drawings.

First Embodiment

Figure 1:
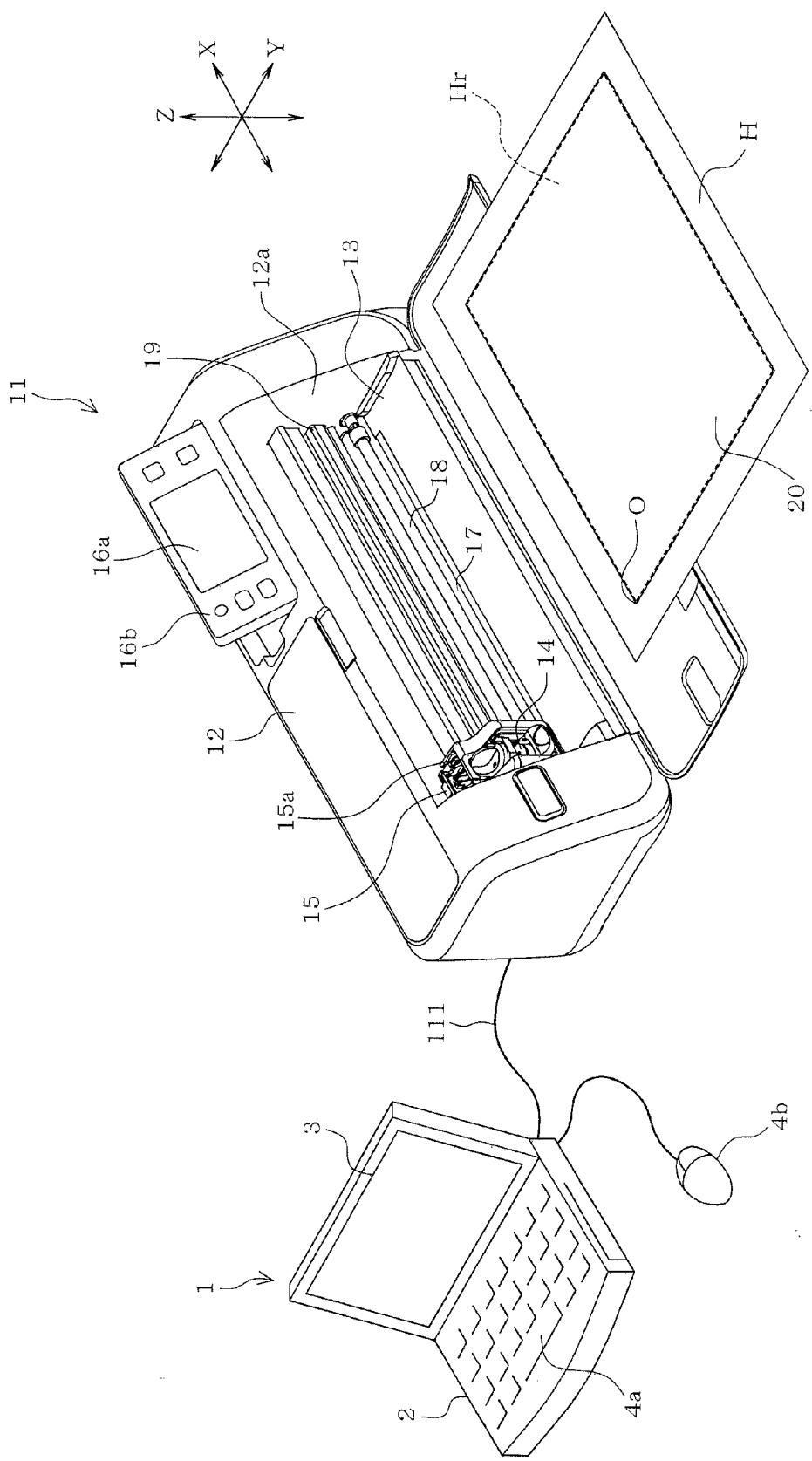
FIG. 1 pertains to a first embodiment and is a perspective view illustrating a cut data generating device and a cutting apparatus connected with one another.

A first embodiment of the disclosure is described hereinafter with reference to the accompanying drawings. FIG. 1 illustrates a cut data generating device 1 and a cutting apparatus 11. The cut data generating device 1 and the cutting apparatus 11 are connected to one another by a communication cable 111.

The cut data generating device 1 is configured by a personal computer (PC) readily available in the market. For example, the cut data generating device 1 is provided with a generating device body 2 configured by the body of the personal computer, a display unit (hereinafter referred to as a display 3) configured by a color liquid crystal display, and an input unit 4 configured by a key board 4a and a mouse 4b. The cut data generating device 1 is further provided with an image scanner 10 (only illustrated in FIG. 2) capable of reading color images.

Figure 2:
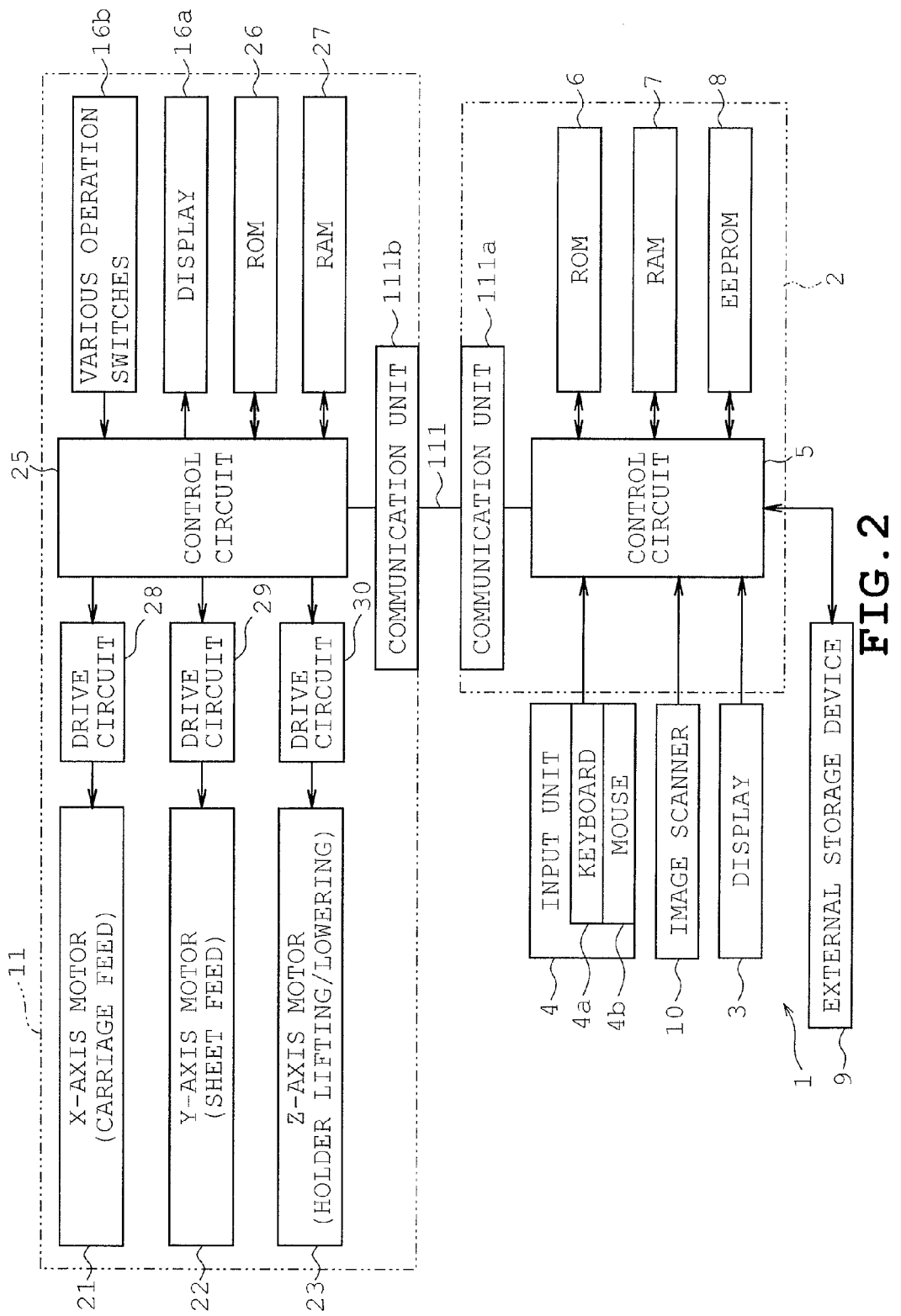
FIG. 2 is a block diagram of an electrical configuration.

As illustrated in FIG. 2, a control circuit 5 of the generating device body 2 is primarily configured by a computer (CPU). The control circuit 5 is connected to a ROM 6, a RAM 7, and an EEPROM 8. Further, the control circuit 5 is connected to the input unit 4 configured for example by the keyboard 4a and the mouse 4b, the display 3, the image scanner 10, and a removable storage device 9 attached to the generator device body 2. When the cut data generating program is executed, various patterns and information required for execution of the program are presented on the display 3. The cut data generating device 1 generates the cut data in response to various inputs and instructions given by the user through keyboard 4a and mouse 4b operations.

The cut data generating program is further provided with a communication unit 111a. The communication unit 111a is connected to a communication unit 111b of the cutting apparatus 11 through the communication cable 111. Thus, the data including the cut data may be exchanged between the cut data generating device 1 and the cutting apparatus 11. The connection between the communication unit 111a of the cut data generating device 1 and the communication unit 111b of the cutting apparatus 11 may be wireless.

The cutting apparatus 11 is configured to cut a workpiece sheet 20 based on cut data. As illustrated in FIG. 1, the cutting apparatus 11 is provided with a body cover 12, a platen 13 disposed inside the body cover 12, a carriage 15 having a cutter cartridge 14 mounted thereon, and a holding member H for holding the sheet 20. The holding member H is shaped like a flat rectangular plate. An adhesive layer Hr (indicated by dotted line in FIG. 1) is provide on the surface of the holding member H. The holding member H, holding the sheet 20, is set to the cutting apparatus 11 so as to be placed on the platen 3 being disposed so as to be substantially level.

The body cover 12 is shaped like a laterally elongate rectangular box. A front opening 12a is formed into the front face of the body cover 12. This front face of the body cover 12 is considered as the front side of the cutting apparatus 11. In the following description, forward and rearward direction in which the holding member H is fed over the platen 13 is defined as the Y direction. The left and right direction orthogonal to the Y direction is defined as the X direction. The up and down direction orthogonal to the platen 13 is defined as the Z direction.

A display 16a and various operation switches 16b are provided on the upper right side portion of the body cover 12. The display 16a is a color liquid crystal display (LCD) for example. The display 16a presents information such as messages which needs attention of the user, etc. The various operation switches 16b are used to select first cut data and the second cut data later described in detail and provide various user instructions.

A drive roller 17 and a pinch roller 18 extending in the left and right direction are provided on the machine frame disposed inside the body cover 12. The drive roller 17 and the pinch roller 18 are disposed one above the other and clamps the edges of the holding member H set on the platen 13 therebetween. A Y-axis motor 22 (see FIG. 2) and a Y-axis transfer mechanism (not shown) are provided inside the body cover 12. The Y-axis transfer mechanism transmits the rotary motion of the Y-axis motor 22 to the drive roller 17 which causes the holding member H to be fed in the Y direction with the sheet 20.

The machine frame disposed inside the body cover 12 is further provided with an X-axis guide rail 19. The X-axis guide rail 19 guides the carriage 15 in the X direction. An X-axis motor 21 (see FIG. 2) and an X-axis transfer mechanism (not shown) are provided inside the body cover 12. The X-axis transfer mechanism transfers the carriage 15 in the X direction along the X-axis guide rail 19 by the rotation of the X-axis motor 21.

A cartridge holder 15a is provided in the front side of the carriage 15. A cutter cartridge 14 is detachably attached to the cartridge holder 15a. A Z-axis motor 23 (see FIG. 2) and a Z-axis transfer mechanism (not shown) are provided inside the carriage 15. The Z-axis transfer mechanism transfers the cartridge holder 15a in the Z direction with the cutter cartridge 14 by the rotation of the Z-axis motor 23.

Though not illustrated in detail, the cartridge holder 15a is lowered by the Z-axis transfer mechanism. This causes the tip of a cutter provided at the lower end of the cutter cartridge 14 to pass through the sheet 20 held by the holding member H. The cutting apparatus 11 transfers the holding member H in the Y direction through the Y-axis transfer mechanism driven by the Y-axis motor 22 and transfers the carriage 15 in the X direction through the X-axis transfer mechanism driven by the X-axis motor 21 with the tip of the cutter passed through the sheet 20 to cause the sheet 20 be cut. The X-axis transfer mechanism, the Y-axis transfer mechanism, and the Z-axis transfer mechanism as well as the corresponding motors 21, 22, and 23 serve as a relative transfer unit configured to relatively transfer the sheet 20 held by the holder H and the cutter of the cartridge holder 14. The relative transfer unit and the cartridge holder 14 serve as a cutting unit.

The cutting apparatus 11 employs an XY coordinate system for example in which the origin O is set to the upper left corner of the adhesive layer 10Hr of the holding member H illustrated in FIG. 1. The holding member H and the cartridge 14 are moved in a relative manner based on the XY coordinate system. The cutting apparatus 11 is further provided with a pen cartridge (not illustrated) in addition to the cutter cartridge. The pen cartridge serves as a printing unit. Thus, the cartridges may be attached selectively to the cartridge holder 15a to allow executing of a cutting operation or printing operation on the sheets 20. The details of the structures of the cutting apparatus 11 will not be described as the structure disclosed in the JP 2014-124748 A filed by the applicant of the present application may be employed.

As illustrated in FIG. 2, the control circuit (control unit, controller) 25 of the cutting apparatus 11 is primarily configured by a computer (CPU). The control circuit 25 is connected to a ROM 26, a RAM 27, and a communication unit 111b. The ROM 26 stores items such as a cut control program for controlling the cutting operation (or the printing operation). The control circuit 25 acquires the cut data generated by the cut data generating device 1 through the communication unit 111b (communication cable 111).

The control circuit 25 is connected to the display 16a and various operation switches 16b as well as drive circuits 27, 28, 29, 30 for driving an X-axis motor 21, a Y-axis motor 22, and a Z-axis motor 23, respectively. The control circuit 25 is configured to control elements such as the X-axis motor 21, the Y-axis motor 22, and the Z-axis motor 23 based on the cut data to automatically execute a cutting operation on the workpiece sheet 20 101 held by the holding member H.

Figure 3A:
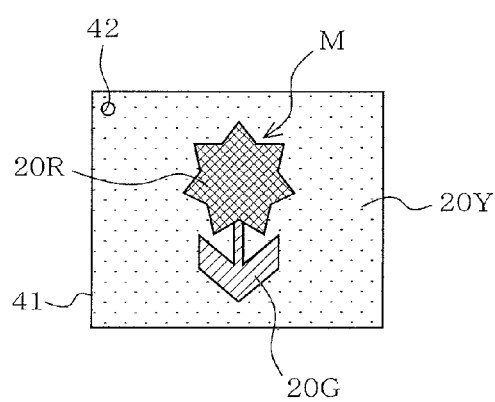
FIG. 3A is a front view illustrating an embellishment in its entirety.
Figure 3B:
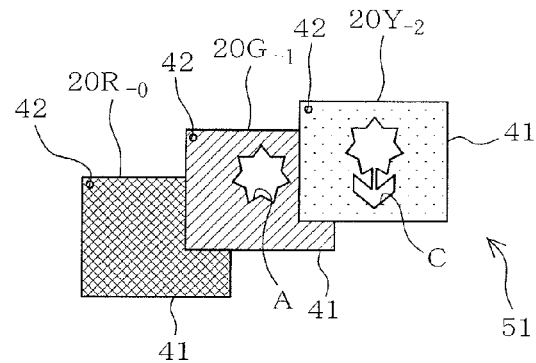
FIGS. 3B and 3C are views for explaining multiple sheets cut by a first mode and a second mode.
Figure 3C:
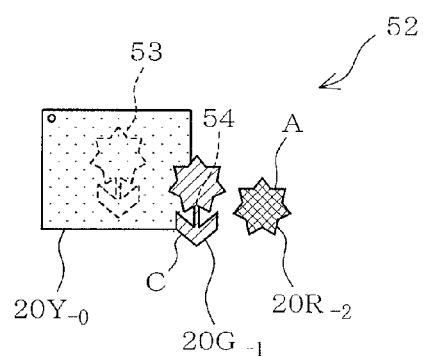

One example of an embellishment made by stacking multiple sheets over one another is illustrated in FIG. 3A. The embellishment represents a "flower". More specifically, an embellishment 51 represents a "flower" expressed by a convex on a surface whereas an embellishment 52 represents a "flower" expressed by a concave on a surface. The embellishments 51 and 52 are created by stacking multiple sheets 20 cut by the cutting apparatus 11 described above. In FIG. 3B, the sheets 20 (20R, 20G, and 20Y) are displaced from one another to show that the "flower" is expressed by a concave. In FIG. 3C, the sheets 20 (20R, 20G, and 20Y) are displaced from one another to show that the "flower" is expressed by a convex.

The "flower" represented by embellishments 51 and 52 is formed of "petals" and "leaves and stem". The "petals" component is referred to as a first subpattern A, "leaves and stem" component is referred to as a second subpattern B, and a pattern obtained by integrating the first subpattern A and the second subpattern B is referred to as a third subpattern C. A pattern obtained by combining the first, second, and third subpatterns A, B, and C is referred to as pattern M. The sheet 20 located in the rearmost (bottommost) side of the stack is referred to as a base sheet 20 (Sheet 20R$_{-0}$ in FIG. 3B and sheet 20Y$_{-0}$ in FIG. 3C). The sheet 20 cut along the outline of either of the first to third subpatterns A to C is placed over the front side of the base sheet 20. The pattern M, being a "flower" formed of first to third subpatterns A to C as illustrated in FIG. 3A, is created in the above described manner. The first embodiment employs three sheets 20, namely, a red sheet 20R representing the "petals", a green sheet 20G representing the "leaves and stem", and a yellow sheet 20Y representing the "back ground" which are not part of the "flower".

The embellishment 51 of FIG. 3B expresses the pattern M of the "flower" by a concave formed by stacking the green sheet 20G in which the first subpattern A is cut out and the yellow sheet 20Y in which the third subpattern C is cut out one after another over the front side of the red base sheet 20R. On the other hand, the embellishment 52 of FIG. 3C expresses the pattern M of the "flower" by a convex formed by stacking the green sheet 20G outlined in the shape of the third subpattern C and the red sheet 20R outlined in the shape of the first subpattern A one after another over the front side of the yellow base sheet 20Y. As illustrated in FIG. 3C, a perforated cut line 53 is formed on the sheet 20Y of the embellishment 52 for alignment of the third subpattern C. Further, a perforated cut line 54 is formed on the sheet 20G of the embellishment 52 for alignment of the first subpattern A. As later described in detail, the perforated cut line 54 is located on the boundary line of the first subpattern A and the second subpattern B.

Cut line data for cutting the sheets 20R, 20G, and 20Y for creating the embellishment 51, in which the pattern M is expressed as a concave, is referred to as first cut data. Cut line data for cutting the sheets 20R, 20G, and 20Y for creating the embellishment 52, in which the pattern M is expressed as a convex, is referred to as second cut data. In both embellishments 51 and 52, the sheet stacked over the front side of the base sheet is referred to as a first sheet, and the sheet stacked over the front side of the first sheet is referred to as a second sheet. In the first embodiment, the reference symbols "R", "G", and "Y" suffixed to the sheets 20 in FIGS. 3A to 3C, etc. indicate the colors of the sheets 20. In this example, "R" indicates the color red, "G" indicates the color green, and "Y" indicates the color yellow. The numbers "$_{-0}$", "$_{-1}$", and "$_{-2}$" suffixed to "G", "R", and "Y" in FIGS. 3A to 3C, etc. indicate that the relevant sheet is the base sheet, the first sheet, and the second sheet, respectively. That is, the numbers indicate the sequence (order) in which the sheets are stacked. For ease of explanation, the first, the second, and the third subpatterns A, B, and C are simply referred to as "subpattern A", "subpattern B", and "subpattern C", respectively.

As illustrated in FIG. 5A, the first cut data contains sequence data (e.g. sheet 1, sheet 2), feed data, coordinate data, stop code, end code, and display data not illustrated for subpattern A of the first sheet 20G and the subpattern C of the second sheet 20Y. More specifically, the "first sheet" and "second sheet" indicated in FIG. 5A are sequence data specifying the sequence in which the first sheet 20G and the second sheet 20Y are to be stacked. The color of each sheet, such as "green" and "yellow" may be associated with the sequence data to identify sheets 20G and 20Y.

Figure 4A:
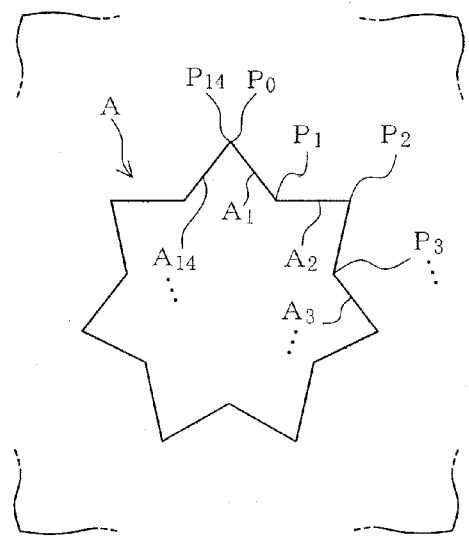
FIGS. 4A and 4B are views for explaining cut data of a first sub pattern and a second subpattern.

The coordinate data is data expressed in XY coordinates plotting the vertexes of the cut lines formed of multiple segments. The coordinate data is defined in an XY coordinate system of the cutting apparatus 11. The cut line of subpattern A indicated in FIG. 4A represents "petals" having an outline formed of fourteen segments A1, A2, . . . , and A14. The cut line data of the subpattern A contains feed data (F1x0, F1y0), a first coordinate data (x1, y1), a second coordinate data (x2, y2), . . . , fourteenth coordinate data (x14, y14) for each of a cut start point $P_0$, vertex $P_1$, vertex $P_2$, ..., and cut end point $P_{14}$. Feed data is data used for transferring the cutter of the cutting apparatus 11 to the cut start point $P_0$ at the beginning of the cutting operation. That is, transfer of the carriage 15 to the cut start point $P_0$ and the up and down movement of the cutter are carried out based on the feed data when the carriage 15 is being fed without cutting any workpieces.

Figure 4B:
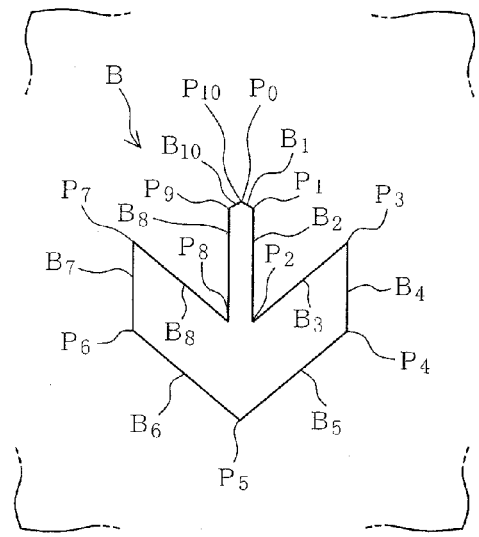
Figure 4C:
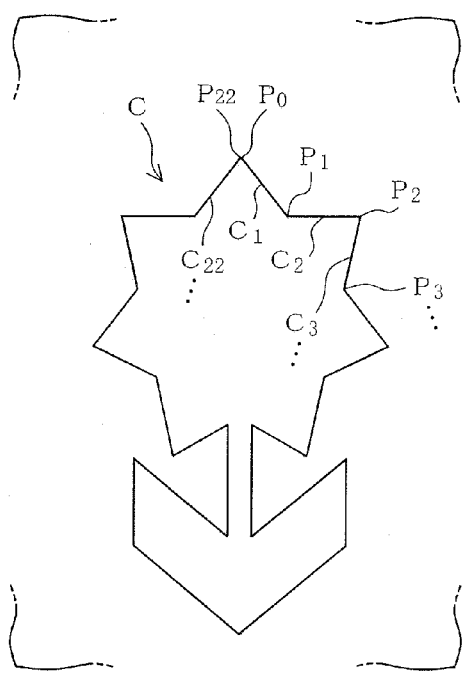
FIGS. 4C and 4D are views for explaining cut data of a third subpattern and a boundary line.

The cut line of subpattern C indicated in FIG. 4C represents outline of a pattern obtained by integrating adjacent subpatterns A and B and is formed of twenty-two segments C1, C2, ..., and C22. That is, the cut line of the subpattern C is obtained by connecting the outer edges of the two subpatterns A and B. The cut line data of the subpattern C contains feed data (F2x0, F2y0), a first coordinate data (x1, y1), a second coordinate data (x2, y2), ..., twenty-second coordinate data (x22, y22) for each of a cut start point $P_0$, vertex $P_1$, vertex $P_2$, ..., and cut end point $P_{22}$. As illustrated in FIG. 5A, the coordinate data of the subpattern A ends with a "stop code" and the coordinate data of the third subpattern C ends with an "end code". Further, the sequence data of the above described first cut data corresponds to the cut sequence of the first sheet 20G and the second sheet 20Y in the cutting operation executed by the cutting apparatus 11.

Control circuit 25 of the cutting apparatus 11 is configured to control a cutting unit to cut the subpattern A of the first sheet 20G and the subpattern C of the second sheet 20Y one after another based on the first cut data. For example, the cutter cartridge 14 (cutter) is relatively moved to the XY coordinate of the cut start point $P_0$ by the X-axis transfer mechanism and the Y-axis transfer mechanism. Then, the blade tip of the cutter is passed through the cut start point $P_0$ of the first sheet 20G by the Z-axis transfer mechanism. The blade tip, penetrating the first sheet 20G, is relatively transferred along segment A1 toward the coordinate of an end point P1 of segment A1. Cutting of subsequent segment A2 is executed consecutively in a similar manner from the endpoint $P_1$ of the previous segment A1. Segments A2 to A14 are cut by relatively moving the cutter along the outline of the subpattern A, that is, the outline of the "petals".

After completing the cutting of the cut line of the subpattern A, the control circuit 25 transfers the blade tip of the cutter to origin O which is the standby position of the carriage 15 based on the stop code, with the blade tip moved away from the first sheet 20G. Then, the second sheet 20Y is set to the cutting apparatus 11 in the place of the first sheet 20G. After completing the cutting of the cut line of the subpattern C, the control circuit 25 transfers the blade tip of the cutter to the standby position based on the end code, with the blade tip moved away from the second sheet 20Y. As the result of the above described cutting operation, it is possible to form cut lines for cutting out the inner sides of the subpattern A and the subpattern C as unnecessary portions from sheet 20G and sheet 20Y, respectively.

The first cut data is not limited to the example illustrated in FIG. 5A but may be configured to contain the cut data for the later described frame lines 41 and matchmarks 42. The first cut data may also be configured to contain cut data for the base sheet 20R for sequence "0".

Figure 5B:
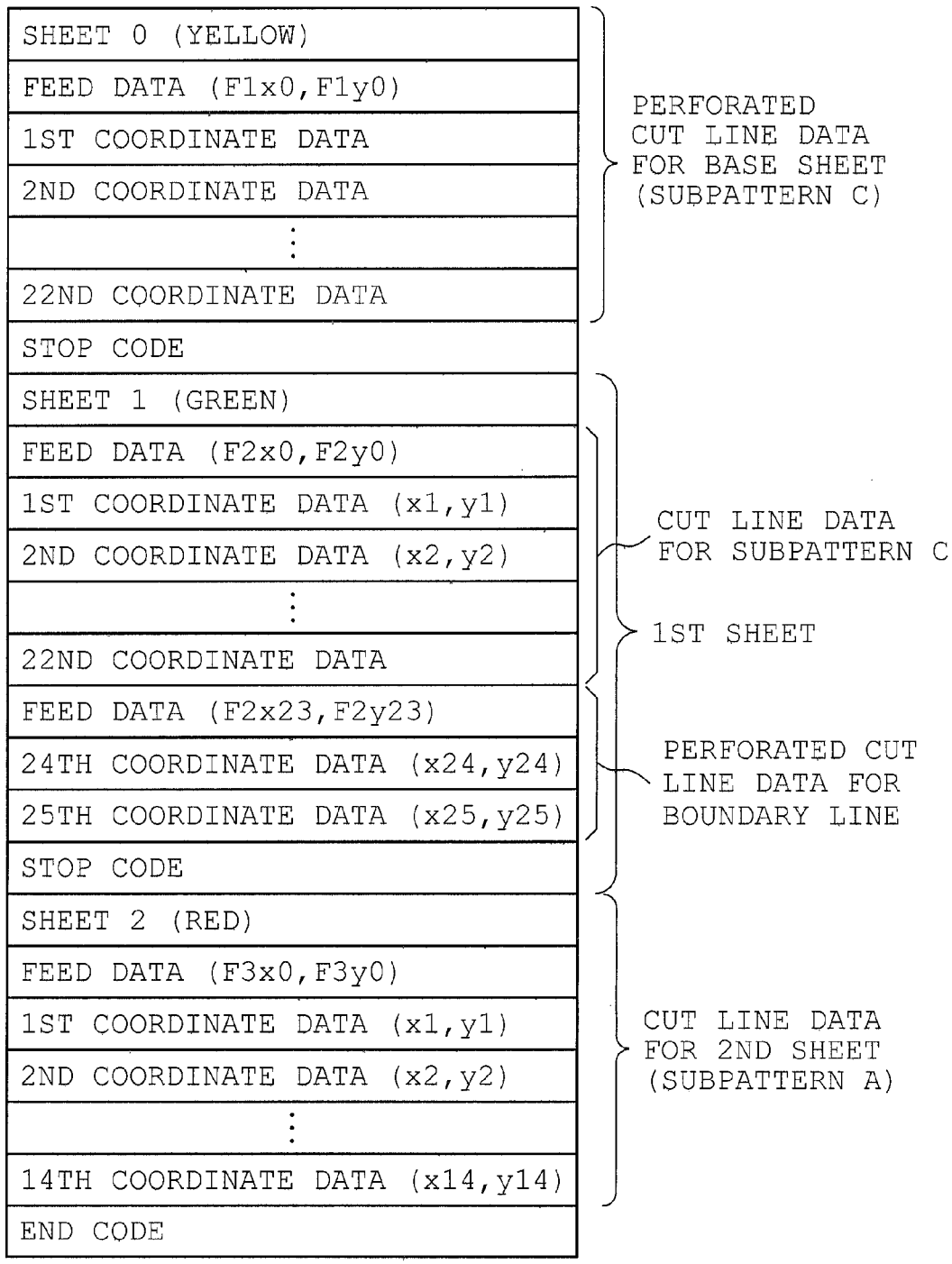

As illustrated in FIG. 5B, second cut data contains the sequence data, the feed data, the coordinate data, the stop code, the end code, and the display code as was the case in the first cut data. The differences between the second cut data and the first cut data will be described hereinafter.

In the second cut data, the base sheet 20Y is given a sequence data "0". Further, in the second cut data, an attribute flag is given for the perforated cut line described earlier. The attribute flag distinguishes a normal cut line used for cutting the subpatterns from a perforated cut line used for alignment of the subpatterns. The perforated cut line is formed when the control circuit 25 executes a control to the move the cutter intermittently in the up and down direction during the cutting operation.

The cut line data in which "0" is specified in the sequence data is given an attribute flag (not illustrated) to form every segment C1 to C22 of the subpattern C as a perforated line. Thus, in the base sheet 20Y in which "0" is specified in the sequence data, cut lines 53 of the subpattern C is formed as a perforated line 53 as illustrated in FIG. 3C.

Figure 4D:
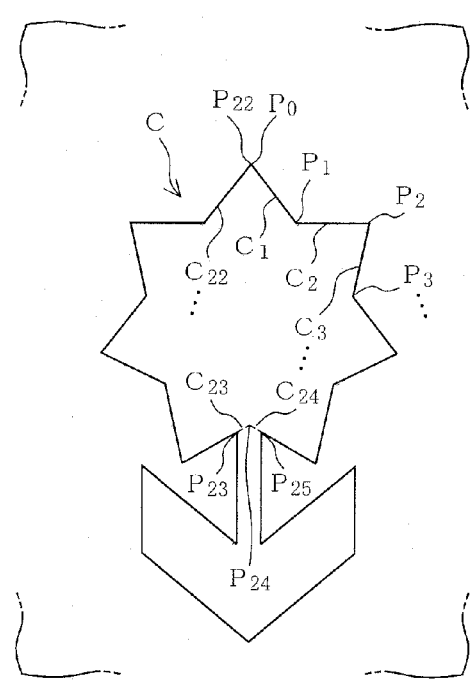

In the first sheet 20G in which "1" is specified in the sequence data, perforated cut line 54 is formed, instead of the cut line of the subpattern C, for alignment of the subpattern A of the second sheet 20R. That is, in the subpattern C of the first sheet 20G, the boundary lines C23 and C24 of the subpattern A representing "petals" and subpattern B representing "leaves and stem" are provided as perforated cut lines as illustrated in FIG. 4D. Thus, the cut line data of the first sheet 20 is provided with feed data (F2x23, F2y23), twenty fourth data (x24, y24), and twenty fifth data (x25, y25) for forming the boundary lines C23 and C24 as perforated lines after cutting the subpattern C as illustrated in FIG. 5B. Cut line data for subpattern A is specified in the second sheet 20R in which "2" is specified in the sequence data.

Control circuit 25 of the cutting apparatus 11 is configured to execute a cutting operation of the base sheet 20Y, the first sheet 20G, and the second sheet 20R based on the second cut data. As the result of the above described cutting operation, it is possible to form cut lines for cutting out the outer sides of the subpattern A and the subpattern C as unnecessary portions from the first sheet 20G and the second sheet 20Y, respectively. Further, perforated cut line 53 for the subpattern C is formed on the base sheet 20Y and perforated cut line 54 serving as boundary lines C23 and C24 are formed on the first sheet 20G.

The first cut data and the second cut data do not contain the cut line data for cutting out only the subpattern B illustrated in FIG. 4B. It is possible to provide the cut line data of the subpattern B in both the first cut data and the second cut data depending upon the sequence in which the sheets 20R to 20Y are stacked etc. (see FIGS. 7C and 8C). The cut line of subpattern B formed of ten segments B1, B2, ..., and B10 serving as an outline represents "leaves and stem" as illustrated in FIG. 4B. Though the cut line data of subpattern B is not illustrated, segment B1 of the subpattern B overlaps with the boundary line C24 of the subpattern C and segment B10 of the subpattern B overlaps with the boundary line C23 of the subpattern C (see FIG. 4D). Segments B2 to B9 have coordinate data overlapping with the segments of the "leaves and stem" of the subpattern C. That is, the combined figure of the subpattern A and the subpattern B and the figure of subpattern C are congruent (meaning that the shape and the size are the same).

The operation of the above described configuration will be described with reference to FIGS. 6 to 12. The flowcharts indicated in FIGS. 9 to 12 indicate the process flow of a cut data generation program executed by the control circuit 5 of the cut data generating device 1. The control circuit 5 of the cut data generating device 1 executes processes indicated in FIG. 9 after invoking the program for cut data generation. First, the control circuit 5 accepts specification of design image serving as a source of cut data (step S1). More specifically, an original image of a "flower" is read by a scanner 10 based on user input for example. The control circuit 5 acquires the design image data (step S2: YES) by the reading through the scanner 10. The design drawn in the original image is a "flower" used for creating the embellishments 51 and 52 illustrated in FIG. 3A. In this example, the design of the "flower" is formed of "petals" colored in red, "leaves and stem" colored in green, and "background" colored in yellow.

Then, the control circuit 5 executes a process to acquire color information of the design image data (step S3). In step S3, the group of pixels of "petals" are identified as a region solely colored in red, the group of pixels of "leaves and stem" are identified as a region solely colored in green, and the group of pixels of "background" are identified as a region solely colored in yellow based on the design image data.

Figure 6:
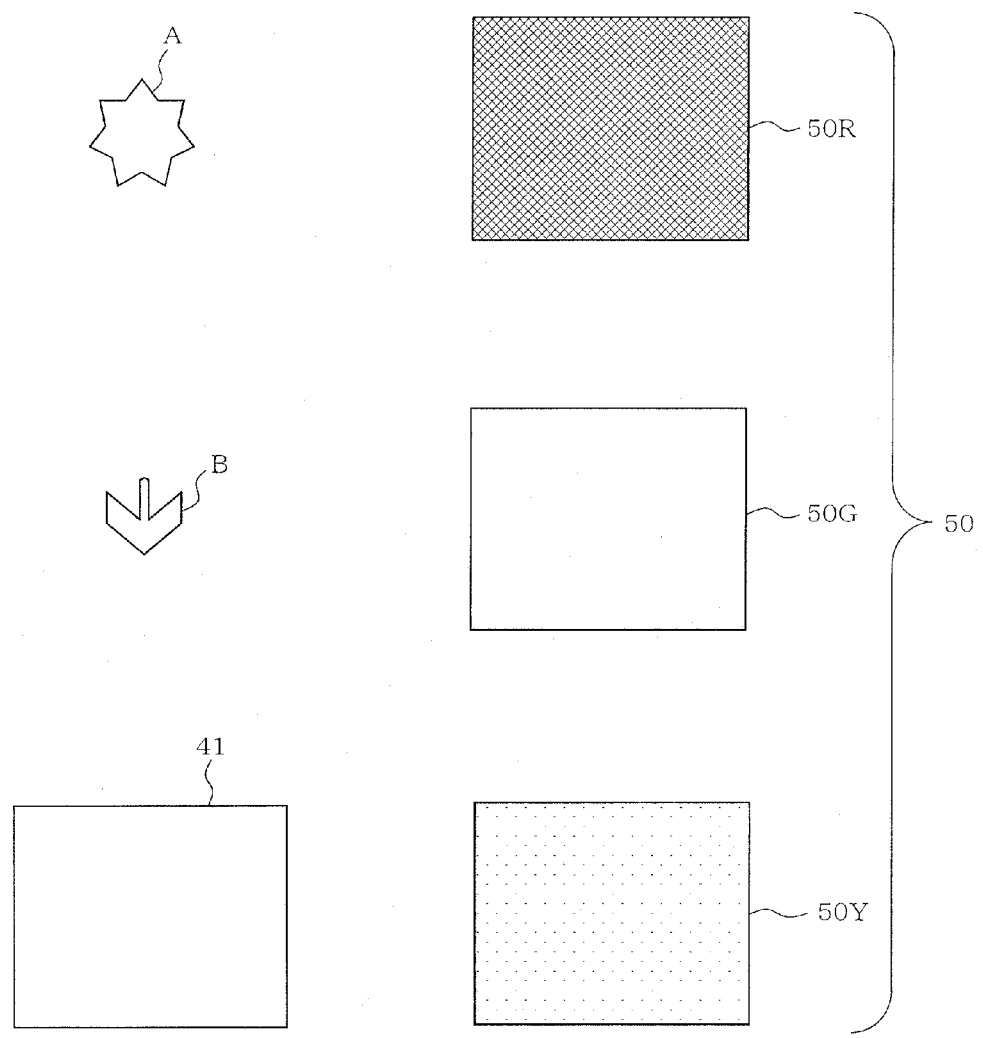
FIG. 6 is a view indicating the mapping between an outline of a subpattern and a layer.
Figure 9:
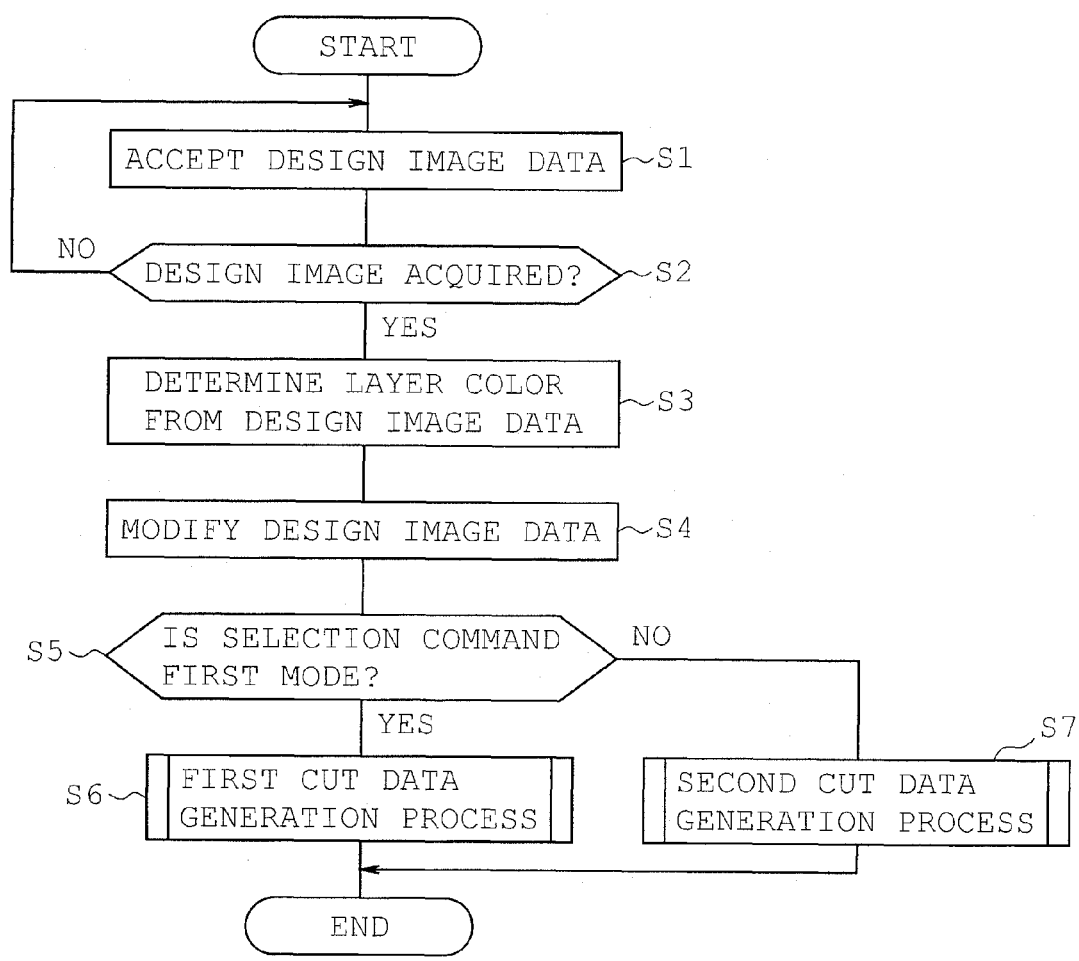
FIG. 9 is a flowchart indicating the overall process flow of a cut data generating program.
Figure 10:
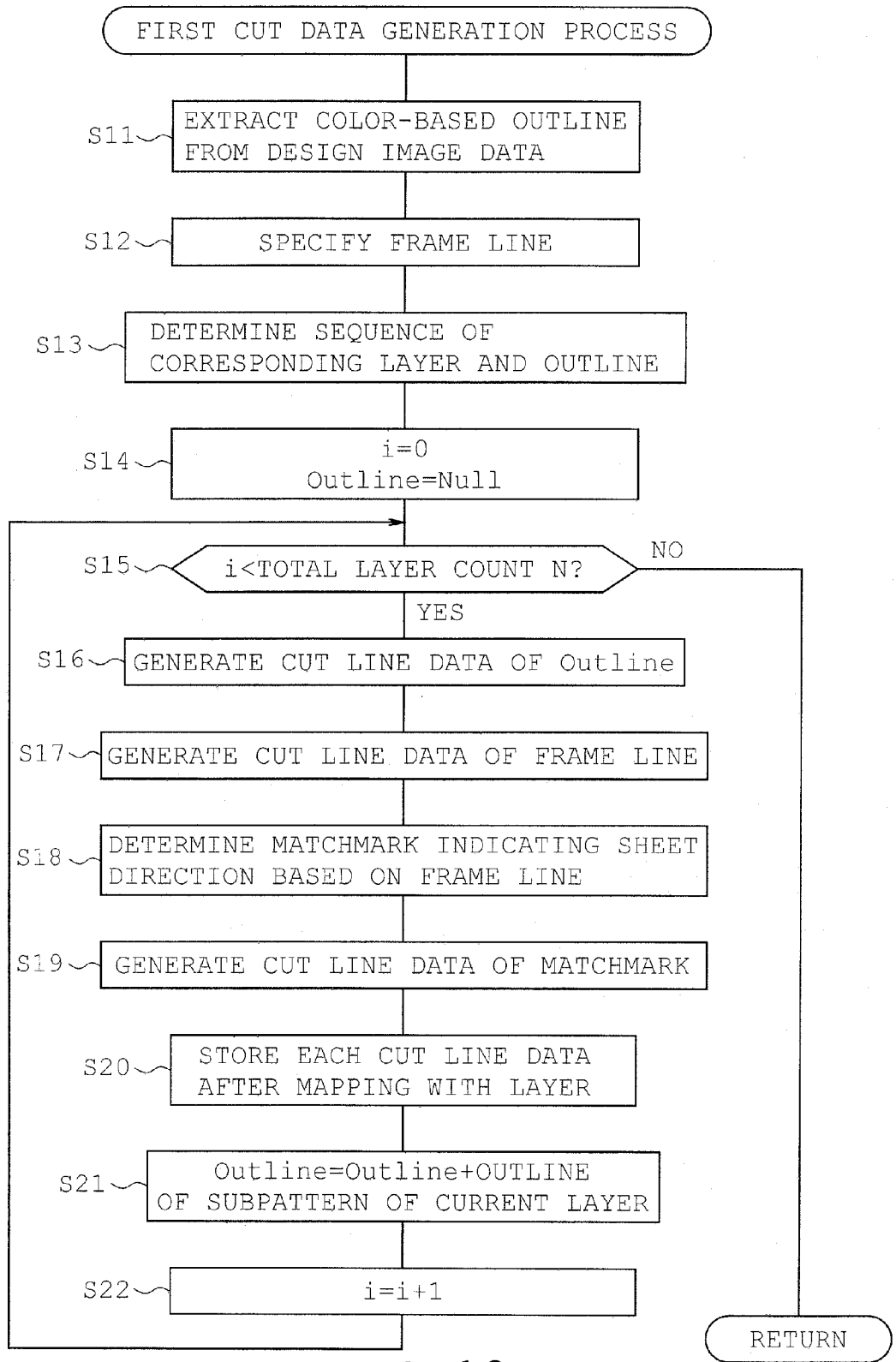
FIG. 10 is a flowchart of a cut data generation process executed under the first mode.
Figure 11:
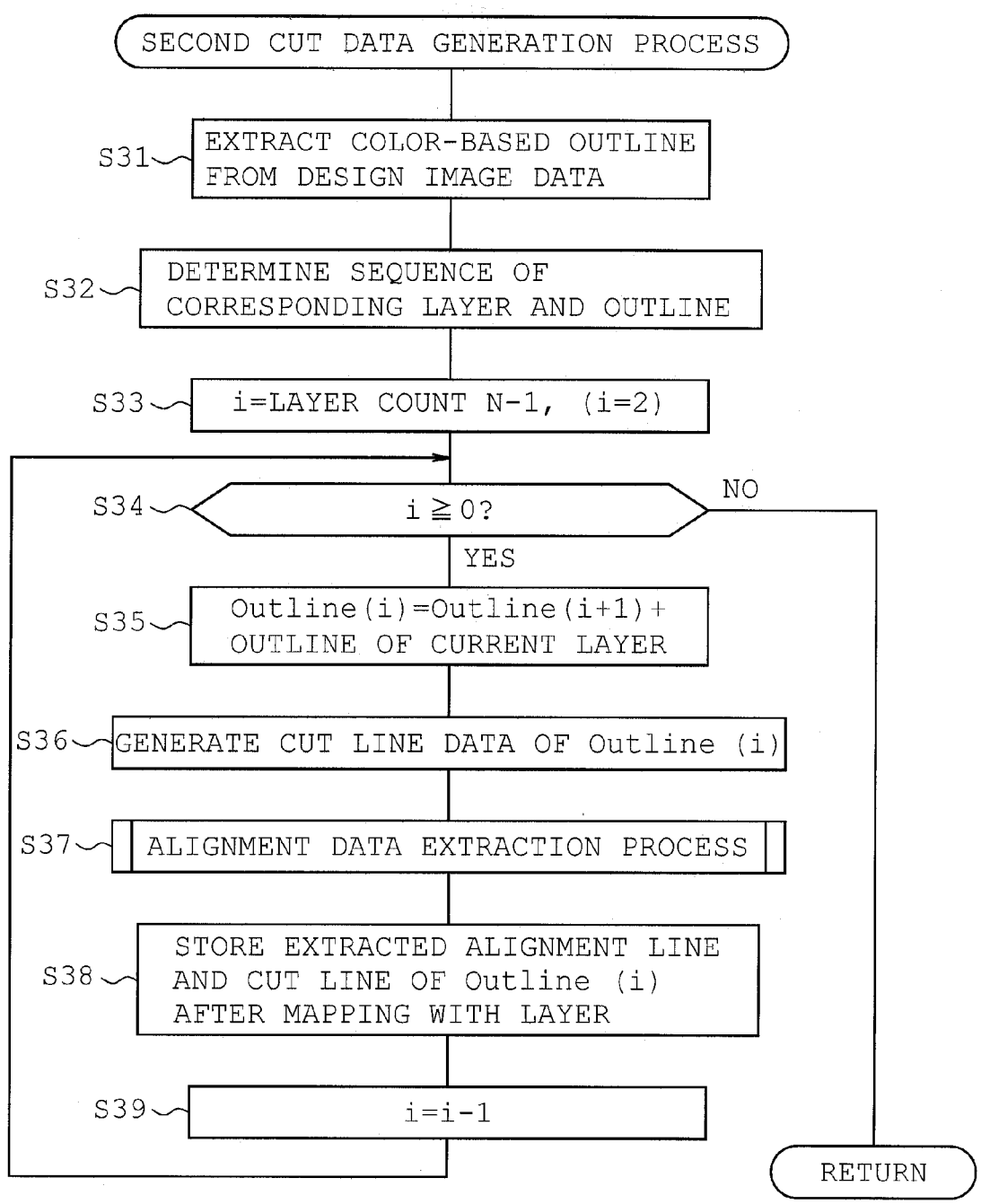
FIG. 11 is a flowchart of a cut data generation process executed under the second mode.

The control circuit 5 stores the three identified colors in the RAM 7 as colors to be applied to the later described layers 50R, 50G, and 50Y (see FIG. 6).

The control circuit 5 further executes a process to modify the design image data (step S4). For example, when the size of the image in the design image data is greater than the corresponding sheet 20 (adhesive layer Hr), the size of the outer edge of the image is modified to match the size of the outer edge of the rectangular sheet 20.

Then, the control circuit 5 judges which of the first mode or the second mode have been selected (step S5) when receiving instructions of selection (selection command) from the input unit 4 such as the mouse 4b. More specifically, the control circuit 5 invokes a mode selection screen (not illustrated) on the display 3a for example for selecting the first mode in which the pattern M is formed as a concave or the second mode in which the pattern M is formed as a convex. When the user selects the first mode by operating the mouse 4b, etc. while viewing the mode selection screen (step S5: YES), the control flow proceeds to the first cut data generation process.

In the first cut data generation process, the control circuit 5 extracts the outlines for "petals", "leaves and stem", and "background" from the design image data by using known image processing methods (step S11). In the first embodiment, the outline is extracted as a vector data containing coordinate data. Further, in this example, the control circuit 5 identifies the "petals" as a part in which a region solely colored in red is surrounded by an outline, that is, as a red subpattern A. The control circuit 5 identifies the "leaves and stem" as the subpattern B in which a region solely colored in green is surrounded by an outline. Further, the control circuit 5 identifies the "background" containing subpatterns A and B (pattern M) as a part surrounded by an outline for cutting the peripheral edge of a frame line 41, that is, the peripheral edge 41 of the sheet 20. It is thus, possible to associate the extracted outline with each of the layers 50R to 50Y.

Next, the control circuit 5 executes a process to specify the frame line 41 containing subpatterns A and B (step S12). In the first embodiment, the outline of the "background" is specified as a rectangular frame line 41. As later described in a second embodiment, the frame line 41 need not be rectangular but may be specified as any shape such as a hexagon (see FIG. 13B).

Then, the control circuit 5 determines the sequence pertaining to the three layers 50R, 50G, and 50Y colored in red, green, and yellow, in which the count of colors acquired in step S3 equals the count of layers (layer count N=3). The control circuit 5 allocates the sequence to each of the layers (step S13). More specifically, sequence "0" is given to the base layer corresponding to the base sheet, sequence "1" is given to the first layer corresponding to the first sheet, and sequence "2" is given to the second layer corresponding to the second sheet. In this example, the control circuit 5 is configured to determine the sequence of the layers 50R to 50Y so that the pattern M may be formed as a concave by judging the relation between the outlines of subpatterns A and B (whether one outline is contained in the other).

That is, suppose that the control circuit 5 has made a judgement that a subpattern is contained in another subpattern in the first mode. In such case, a smaller sequence number is given to the layer indicating the color of the subpattern contained in another pattern and a greater sequence number is given to the layer indicating the color of the subpattern containing another pattern. Further, the greatest sequence number is given to the layer 50Y indicating the color of the outermost part which is the "background" in this example. Because the outlines of the subpatterns A and B of the first embodiment do not contain the outline of another subpattern, "0" is specified to the layer 50R, "1" is specified to layer 50G, and "2" is specified to layer 50Y. Alternatively, "0" may be specified to layer 50G, "1" may be specified to layer 50R, and "2" may be specified to layer 50Y.

The control circuit 5 determines the sequence number of the layers 50R to 50Y in the above described manner and stores the outlines of subpatterns A and B with a mapping to the layers 50R to 50Y indicating the colors of the subpatterns. The following description is given with an assumption that the layer 50R is specified as the base layer, the layer 50G is specified as the first layer, and the layer 50Y is specified as the second layer. It is further, assumed that the outline of the subpattern A is associated with the base layer 50R and the outline of the subpattern B is associated with the first layer 50G.

The control circuit 5 is configured to execute an allocation process for generating and allocating cut data for each of the layers 50R to 50Y based on the determined sequence. First, at step S14, the control circuit 5 initializes counter i to 0 (i=0). The counter i indicates the sequence in which the layers 50R to 50Y are stacked. As a result, the allocation process is carried out from the base layer 50R located in the rearmost side. Further, the control circuit 5 specifies "Null" to "Outline". "Outline" is information indicating the group of vector data of the outlines of the subpatterns. As described above, the counter i is currently specified to "0" (step S15: YES) and "Null" is further specified to "Outline". Thus, cut line data is not generated for the outline of the base layer 50R having the sequence number specified to "0" (step S16).

On the other hand, the control circuit 5 generates cut line data in which the vertex $P_0$ serves as the cut start point and the cut end point $P_4$ based on the coordinate data of vertexes $P_0$ to $P_4$ of the frame line 41 specified at step S12 (step S17, see FIG. 7B). The generated cut line data contains the feed data, the first coordinate data, the second coordinate data, the third coordinate data, and the fourth coordinate data of the cut start point $P_0$, the vertex $P_1$, the vertex $P_2$, the vertex $P_3$, and the cut end point $P_4$, respectively.

Further, the control circuit 5 specifies the coordinate of a match mark 42 indicating the orientation of the base sheet 20 based on the coordinate data of the frame line 41 (step S18). The matchmark 42 is a circular hole sized so as to be capable of passing a string therethrough for example as illustrated in FIG. 7B. Suppose that the location of the matchmark 42 is preset so as to be disposed at the coordinate indicating the upper left corner of the base layer 50R. The control circuit 5 generates cut line data for cutting out the matchmark 42 based on the coordinate data of the matchmark 42 after the location of the same has been determined (step S19). The generated cut line data contains feed data and multiplicity of coordinate data corresponding to multiple points located on the circumference of the matchmark 42.

Thus, the control circuit 5 stores the cut line data of the frame line 41 and the matchmark 42 generated for the base layer 50R in the RAM 7 with a mapping to the sequence number "0" (step S20). The control circuit 5 further specifies the "Outline" to the vector data of the outline of the subpattern A mapped to (associated with) the base layer 20 at step S13 (step S21). Then, the control circuit 5 increments the counter i by 1 (step S22) so that the steps S15 to S22 are executed for the first layer 50G in which "1" is specified to the sequence number.

That is, when the counter i is 1 (step S15: YES), the control circuit 5 generates cut line data of the outline for the first layer 50G, in which the vertex $P_0$ serves as the cut start point and the cut end point $P_{14}$, based on the coordinate data of each of the vertexes $P_0$ to $P_{14}$ of the subpattern A specified to "Outline" (see FIGS. 4A and 5A). The control circuit 5 further generates cut line data of the frame line 41 and the matchmark 42 being the same as the base layer 50R for the first layer 50G (step S17 and S18). Thus, the control circuit 5 stores the cut line data of the outline of the subpattern A, the frame line 41, and the matchmark 42 generated for the first layer 50G to the RAM 7 with a mapping to the sequence number "1" (step S20).

Control circuit 5 further integrates the outline of the subpattern A specified to "Outline" with the outline of the subpattern B associated with the first layer 50G (step S21). Thus, the control circuit 5 specifies (updates) the "Outline" as a group of vector data indicating the outline of a single subpattern C. Further, the control circuit 5 increments the counter i by 1 (step S22) so that the steps S15 to S22 are executed for the second layer 50Y in which "2" is specified to the sequence number.

In this case, the current value of counter i is 2 (step S15: YES) and the control circuit 5 generates cut line data of the outline for the second layer 50Y, in which the vertex $P_0$ serves as the cut start point and the cut end point $P_{22}$, based on the coordinate data of each of the vertexes $P_0$ to $P_{22}$ of the subpattern C specified to "Outline" (see FIGS. 4C and 5C). The control circuit 5 further generates cut line data of the frame line 41 and the matchmark 42 being the same as the base layer 50R for the second layer 50Y (step S17 and S18). Thus, the control circuit 5 stores the cut line data of the outline of the subpattern C, the frame line 41, and the matchmark 42 for the second layer 50Y to the RAM 7 with a mapping to the sequence number "2" (step S20).

In the subsequent step S21, the "Outline" is not updated since the outline of the subpattern associated with the second layer 50Y does not exist. Further, after the control circuit 5 increments the counter i by 1 (step S22), the control circuit 5 makes a judgement at step S15 that the value "3" of the counter i has reached the layer number N (NO). In such case, the control circuit 5 appends the end code or the display data, etc. described earlier to the cut line data associated with layers 50R to 50Y of sequence numbers "0" to "2" and terminates the generation of the first cut data (END).

The condition specified by the execution of the steps S14 to S22 in which the outline of subpattern A (or subpattern B) is specified to the first layer 50G and the outlines of both the subpattern A and the subpattern B (subpattern C) are specified to the second layer 50Y is referred to as a first condition for expressing the pattern M by a concave. Thus, the display data generated under the first condition is capable of expressing the pattern M by a concave profile by using layers 50R to 50Y. That is, a green image layer 50G in which the inner side of the outline of the subpattern A is cut out is generated for the first layer 50G and a yellow image layer 50Y in which the inner side of the outline of the subpattern C is cut out is generated for the second layer 50Y. Then, the green image layer 50G is stacked over the front side of the image layer 50R serving as the base layer 50R and the yellow image layer 50Y is stacked over the front side of the green image layer 50G (see FIG. 7A). The inner side of the subpattern C of the foremost yellow image layer 50Y is colored in the red and the green of the image layers 50R and 50G located in the rear side of the stack to create the pattern M formed of a concave.

Further, the first cut data generated in the cut data generating device 1 side may be received by the cutting apparatus 11 side to execute the cutting operation based on the first cut data. Thus, the cutting apparatus 11 may cut the sheet 20R colored in red, the sheet 20G colored in green, and the sheet 20Y colored in yellow according to the sequence data of "0", "1", and "2" of the first cut data.

Thus, it is possible to create an embellishment 51 of pattern M depicting a "flower" expressed by a concave formed of a combination of subpatterns A and C of different shapes by stacking sheets 20R to 20Y according to the cut sequence by following the matchmarks 42 as illustrated in FIG. 3B.

Next, a description will be given on a second cut data generation process when the second mode is selected (step S5: NO) with reference to FIG. 11.

In the second cut data generation process, each of the outlines for "petals", "leaves and stem", and "background" are extracted from the design image data as was the casein the first cut data generation process (step S31).

Further, the control circuit 5 judges whether the outline of one of the subpatterns A and B is contained in the outline of the other. The control circuit 5 determines the sequence of the layers 50R to 50Y so that the pattern M is expressed as a convex based on the result of judgement (step S32). That is, when there is a subpattern contained in another subpattern in the second mode, the control circuit 5 gives a larger number to the layer indicating a color of the subpattern contained in another pattern and a smaller number to the layer indicating a color of the subpattern containing another pattern.

Further, the smallest sequence number is given to the layer 50Y indicating the color of the outermost part which is the "background" in this example. Because the outlines of the subpatterns A and B of the first embodiment do not contain the outline of another subpattern, "0" is specified to the layer 50Y, "1" is specified to layer 50G, and "2" is specified to layer 50R. Alternatively, "0" may be specified to layer 50Y, "1" may be specified to layer 50R, and "2" may be specified to layer 50G (See FIGS. 7B, 7C, 8B, and 8C).

The control circuit 5 determines the sequence number of the layers 50R to 50Y in the above described manner and stores the outlines of subpatterns A and B with a mapping to the layers 50R to 50Y indicating the colors of the subpatterns. The following description is given with an assumption that the layer 50Y is specified as the base layer, the layer 50G is specified as the first layer, and the layer 50R is specified as the second layer. It is further, assumed that the outline of the subpattern A is associated with the base layer 50R and the outline of the subpattern B is associated with the first layer 50G.

The control circuit 5 is configured to execute an allocation process for generating and allocating cut data for each of the layers 50R to 50Y based on the determined sequence. In the initial setting (step S33), the control circuit 5 decrements the layer count N by 1 (i=N−1) and sets the counter i to 2 (i=2). That is, in the second mode, the allocation process is carried out from the second layer 50R being the foremost layer. As later described in detail, the alignment line is perforated cut line.

Next, the control circuit 5 specifies the "Outline$_{(i)}$" for which the cut line is to be generated (step S35) in the second layer 50R in which the counter i indicates "2" (step S34: YES). At step S35, the outline of the subpattern of the layer identified by the counter i and the outline of the subpattern of the layer$_{(i+1)}$ stacked over the layer identified by the counter i are integrated. However, since there is no layer stacked in the front side of the second layer 50R, the outline of the subpattern A associated with the second layer 20R is specified as the Outline$_{(1)}$ (step S35). Thus, the control circuit 5 generates the cut line data of subpattern A based on the coordinate data each of the vertexes $P_0$ to $P_1$ of subpattern A specified as "Outline$_{(1)}$" (see step S36, FIGS. 4A and 5B).

Figure 12:
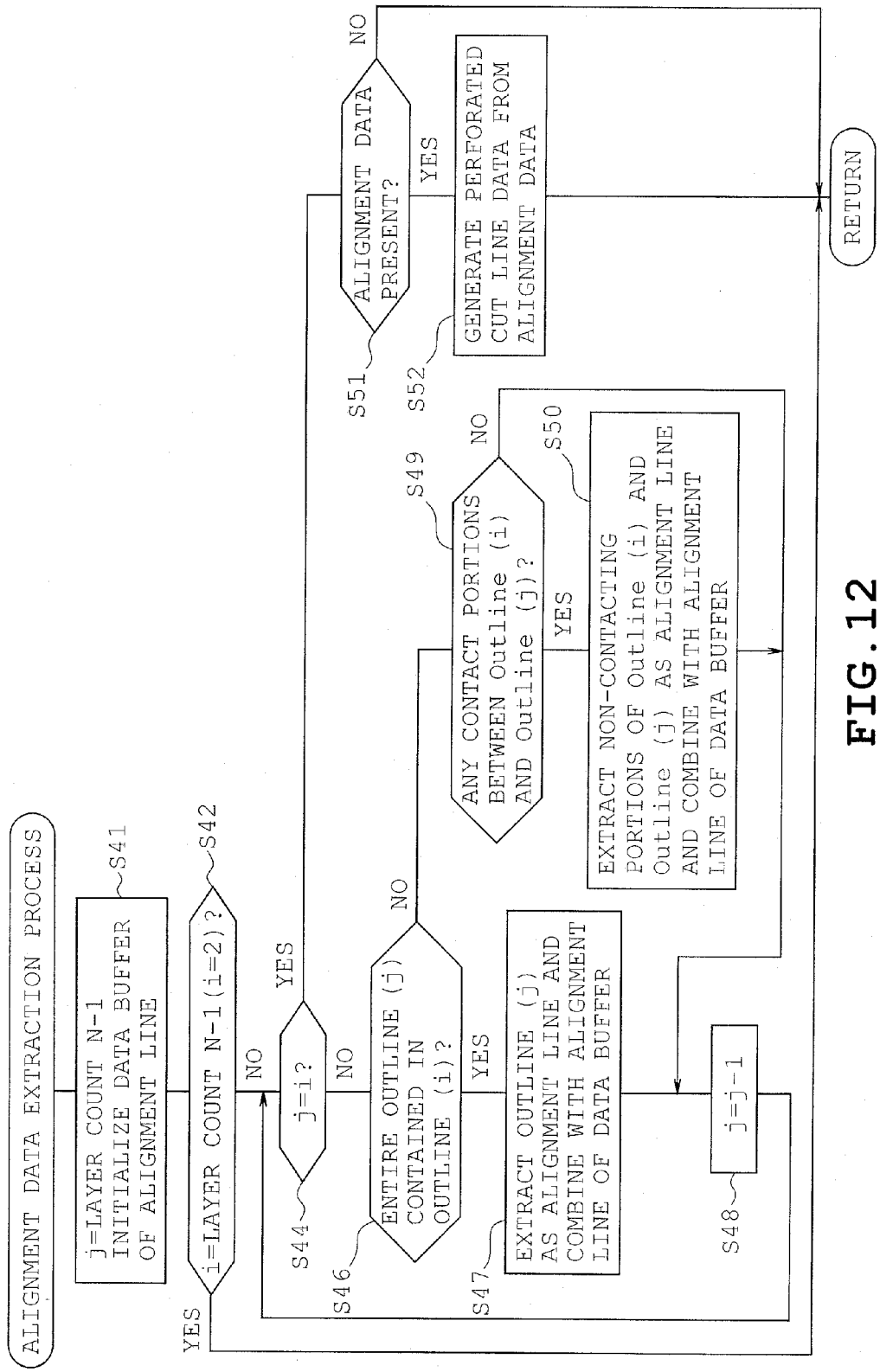
FIG. 12 is a flowchart of an alignment data extraction process.

Then, at step S37, an alignment data extraction process indicated in FIG. 12 is carried out for second layer 50R. When the counter i is "2", that is, with respect the second the layer 50R located in the foremost side, the control circuit 5 makes a "YES" judgement at step 42 after completing the initial setting at step S41. Thus, the control circuit 5 returns the process flow back to step S38. Thus, no data is generated for the alignment line in the second layer 50R in the foremost side.

The control circuit 5 stores the cut line data of the outline of the subpattern A formed with respect to the second layer 50R to the RAM 7 with a mapping to the sequence number "2" (step S38). Further, the control circuit 5 decrements the counter i by 1 (step S39) and executes steps S34 to S39 with respect to the first layer 50G.

In this case, since the current value of counter i is 1 (counter i=1) (step S34: YES), the control circuit 5 integrates the outline of subpattern B associated with the first layer 50G and the outline of the subpattern A specified as Outline$_{(i+1)}$ (step S35). The control circuit 5 thus, specifies Outline$_{(i)}$ as a group of vector data representing the outline of subpattern C. Based on the coordinate data of vertexes $P_0$ to $P_{22}$ of subpattern C specified as Outline$_{(1)}$, the control circuit 5 generates cut line data of the outline for subpattern C in which the vertex $P_0$ serves as the cut start point and the cut end point $P_{22}$ (see FIGS. 4C and 5B). The control circuit 5 executes alignment data extraction process indicated in FIG. 12 with respect to the first layer 50G (step S37).

In the initial setting of the alignment extraction process (step S41), the control circuit 5 sets target counter j to "2" by decrementing the layer count N by 1 (j=N−1). That is, the presence/absence of a subpattern eligible for alignment with the first layer 50G in which the current value of counter i is 1 judged starting from the foremost second layer (j=2). The control circuit 5 further initializes the data buffer of the RAM 7 in which the data (vector data) of the alignment line to be extracted is to be stored. In the first embodiment, the storage area of the RAM 7 in which the alignment line of the vector data is stored will be referred to as a data buffer.

The control circuit 5 forms an alignment line provided that the counter i is not "2" (step S42: NO), that is, the foremost second layer 50R is not targeted for forming the alignment line. Since the current value of the counter i is "1", the control circuit 5 makes a judgement that counter i does not match the current value "2" of the target counter "j" (step S44: NO). The control circuit 5 further judges whether or not the entirety of the outline of subpattern A serving as Outline$_{(j)}$ of the second layer 50R is encompassed inside the outline of the subpattern C specified as the Outline$_{(i)}$ of the first layer 50G (step S46). In this example, the entirety of the outline of the subpattern A is not encompassed in the outline of the subpattern C (step S46: NO). Then, the control circuit 5 judges whether any portions of the outline of the subpattern C contact any portions of the outline of subpattern A (step S49).

In this example, the outline of the subpattern C and the outline of the subpattern A contact one another or overlaps at the "petals" portion (step S49: YES, see FIG. 4D). Segments C23 and C24 are noncontact portions of the outline of subpattern C and the outline of subpattern A. The control circuit 5 extracts segments C23 and C24 as an alignment line 54 (corresponding to the perforated cut line 54) and stores segments C23 and C24 in the data buffer (step S50). Thereafter, the control circuit 5 decrements the target counter j by 1 (j=j−1) at step S48 and returns the process flow back to step S44. As a result, the value of the target counter j is reduced to 1 and becomes equal to the value of counter i (step S44: YES). The process flow thereafter proceeds to step S51.

The control circuit 5, when judging the presence of an extracted alignment line 54 by searching the data buffer (step S51: YES), generates cut line data extending along points $P_{23}$ to $P_{25}$ based on the coordinate data of the alignment line 54 (see FIGS. 4D and 5B). The control circuit 5 further applies attribute flag to the cut line data of the alignment line 54. Identification of a perforated cut line is carried out according to the above described process flow and the process flow is returned to step S38 indicated in FIG. 11.

The control circuit 5 stores the cut line data of the outline of the subpattern C and the alignment line 54 generated for the first layer 50G to the RAM 7 with a mapping to sequence number "1" (step S38). Further, the control circuit 5 decrements counter i by 1 (step S39) and executes steps S34 to S39 for the base layer 50Y.

The base layer 50Y is a "background" part free of subpatterns. Thus, the control circuit 5, when judging that the value of counter i is 0 (step S34: YES), does not generate cut line data even if integrated with subpattern C (Outline$_{(i+1)}$) (step S35, S36). On the other hand, the cut line data for the alignment line is formed for the base layer 50Y at step S37 of the alignment data extraction process (see FIG. 12).

In the alignment data extraction process, the control circuit 5 sets 2 to the target counter j (j=N−1) and initializes the data buffer (step S41). Then, the control circuit 5 judges that the value of counter i is not 2 and further does not equal the value counter j (step S42: NO and step S44: NO).

Then, the control circuit 5 judges whether or not the Outline$_{(j)}$ (outline of subpattern A) of the foremost second layer 50R is entirely encompassed inside the Outline$_{(i)}$ of the base layer 50Y, that is, inside the frame line 41 (step S46). Because the outline of the subpattern A is entirely encompassed inside the frame line 41 (step S46: YES), the control circuit 5 extracts the outline of the subpattern A as an alignment line and stores the same in the data buffer (step S47). Then, at step S48, the control circuit 5 decrements the target counter j by 1 to reduce the count to 1 (j=1) and returns the process flow back to step S44.

At step S44, the value of target counter j does not match the value of counter i and thus, meets to proceed further with the extraction process (step S44: NO). Then, the control circuit 5 judges whether or not the Outline$_{(j)}$ (outline of subpattern C) of the first layer 50G is entirely encompassed inside the frame line 41 of the base layer 50Y (step S46). Because the outline of the subpattern C is entirely encompassed inside the frame line 41 (step S46: YES), the control circuit 5 extracts the outline of the subpattern C as an alignment line 53 and integrates it with the outline (alignment line) of the subpattern A extracted earlier. Then, the control circuit 5 stores the integrated alignment line in the data buffer (step S47). In this example, the subpattern A located relatively forward is contained within the bounds of the subpattern C located relatively rearward. As a result, the integration of the alignment lines is carried out so that only the alignment line 53 (perforated cut line 53 described earlier) of the subpattern C remains. Thus, the data buffer is updated with the data of alignment line 53 of subpattern C.

Then, at step S48, the control circuit 5 decrements the target counter j by 1 to reduce the count to 1 (j=0) and returns the process flow back to step S44. At step S44, the control circuit 5 makes a judgment that the value of target counter j (j=0) matches the value of counter i (i=0) (step S44) and proceeds to step S51. Then, the control circuit 5 generates cut line data of the sub pattern C (see FIGS. 4C and 5B) based on the alignment line 53 stored in the data buffer (step S51: YES). The control circuit 5 further appends an attribute flag to the cut line data of the alignment data 53 to identify the cut line data of the alignment data 53 as a perforated cut line and returns the process flow back to step S38 of FIG. 11.

The control circuit 5 stores the cut line data for the alignment line 53 of subpattern C formed with respect to the base layer 50Y to the RAM 7 with a mapping to sequence number "0" (step S38). Then, the control circuit 5 makes a judgement that all of the layers 50R to 50Y have been processed (step S34: NO) by decrementing the counter i by 1 (step S39). The control circuit 5 appends the end code, the display data, etc. to the cut line data associated with the layers 50R to 50Y of sequence numbers "0" to "2" and terminates the generation process of the second cut data (END).

The condition specified by the execution of the steps S33 to S39 in which: the outline of subpattern C, obtained by integrating the subpattern A and the subpattern B is specified to the first layer 50G and the outline of the subpattern A or the subpattern B is specified to the second layer 50Y is referred to as a second condition for expressing the pattern M by convex. Thus, the display data generated under the second condition is capable of expressing the pattern M by a convex profile by using layers 50R to 50Y. That is, a green image layer 50G having an outline in the shape of the subpattern C is generated for the first layer 50G, and a red image layer 50R having an outline in the shape of the subpattern A is generated for the second layer 50R. Then, the green image layer 50G is stacked over the front side of the yellow image layer 50Y and the red image layer 50R is stacked over the front side of the green image layer 50G (see FIG. 8A). As a result, the red subpattern A and the green subpattern C of the forward layers 50R and 50G are applied to the yellow image layer 50Y of the rearmost side to create pattern formed by convex.

Further, the second cut data generated in the cut data generating device 1 side may be received by the cutting apparatus 11 side to execute the cutting operation based on the second cut data. Thus, the cutting apparatus 11 may cut the yellow sheet 20Y, the green sheet 20G, and the red sheet 20R according to the sequence data of "0", "1", and "2" of the second cut data.

Thus, it is possible to create an embellishment 52 of pattern M depicting a "flower" expressed by a convex formed of a combination of subpatterns A and C of different shapes by stacking the first sheet 20G in alignment with the alignment line 53 of the base sheet 20Y and by stacking sheet 20R in alignment with the alignment line 54 of the first sheet 20G as illustrated in FIG. 3C.

Three sheets 20 including the base sheet 20 provided in the above described example may be changed to four or more sheets. It is also possible to generate the first cut data creating a concave pattern M according to the first condition or the second cut data creating a convex pattern M according to the second condition when four or more sheets 20 are used through execution of the cut data generating program. Especially in the first embodiment, process steps (any one of steps S21, S35, S47, and S50) are performed to integrate the outlines or the alignment lines of the subpatterns depending upon the sequence in which the sheets are stacked under the first or the second condition. It is thus, possible to generate cut data capable of expressing the pattern M in a concave profile or a convex profile by stacking multiple sheets 20.

As described above, the method of generating cut data of the first embodiment includes: determining a sequence for stacking plural sheets 20 (steps S13, S32); specifying the outline of each subpattern to each of the plural sheets 20 in which the sequence has been determined (steps S13, S21, S32, and S35); and generating cut data based on the outline of each subpattern specified to each sheet 20 (steps S16, S20, S36, and S38).

Accordingly, the sequence in which the sheets 20 are stacked are determined in the sequence determining step and the outlines of the subpatterns are specified to the sheets 20 in which the sequence has been determined. It is thus, possible to generate cut data for cutting the outlines of subpatterns specified depending upon the sequence in which the sheets 20 are stacked. Hence, it is possible to create embellishments 51 and 52 expressing different styles of pattern M, formed of a combination of multiple subpatterns, by cutting the sheets 20 based on the generated cut data and stacking the cut sheets 20.

Further, the control circuit 5 of the cut data generating device 1 is configured to determine a sequence for stacking plural layers 50 associated with the plural sheets 20 (sequence determining unit); specify the outline of each subpattern to each of the plural layers 50 in which the sequence has been determined (outline specifying unit); and generate cut data associated with each of the plural sheets 20 based on the outline of each subpattern specified to each of the plural layers 50 (cut data generation unit).

Accordingly, the sequence in which the plural layers 50 associated with the plural sheets 20 are stacked are determined by the sequence determining unit and the outlines of the subpatterns are specified to the layers 50 in which the sequence has been determined by the outline specifying unit. It is thus, possible to generate cut data for cutting the outlines of subpatterns specified depending upon the sequence in which the layers 50 are stacked. Hence, it is possible to create embellishments 51 and 52 expressing different styles of pattern M, formed of a combination of multiple subpatterns, by cutting the sheets 20 based on the generated cut data and stacking the cut sheets 20.

The method of generating cut data is provided with a selection step (step S5) of selecting either of a first mode creating the pattern with respect to a foremost sheet 20 (layer 50) of the plural sheets 20 (layers 50) stacked, the pattern being expressed by concaves in which the subpatterns are concaved rearward relative to the foremost layer, or a second mode creating the pattern with respect to a rearmost sheet 20 of the plural sheets 20 stacked, the pattern being expressed by convexes in which the subpatterns are convexed forward relative to the rearmost layer. The control circuit 5, the display 3, and the input unit 4 serve as an input unit or inputter for inputting instructions to select either of the first mode and the second mode.

Accordingly, it is possible to select whether to create pattern M of the embellishments 51 and 52 in a convex profile or a concave profile by selecting either of the first mode and the second mode in the selection step (by the input unit). It is thus, possible to generate cut data capable of obtaining embellishments 51 and 52 in the styles desired by the user.

The outline specifying step (outline specifying unit) specifies the outline of each subpattern to each of the sheets 20 (layers 50) based on a predetermined first condition for expressing the pattern by concaves when the first mode is selected in the selection step (selecting unit) and specify the outline of each subpattern to each of the sheets 20 based on a predetermined second condition for expressing the pattern by convexes when the second mode is selected in the selection step.

Accordingly, it is possible to generate cut data suitable for concaved pattern M since the outline of the subpattern is specified for each sheet 20 based on a predetermined first condition by selecting the first mode. Similarly, it is possible to generate cut data suitable for convexed pattern M since the outline of the subpattern is specified for each sheet 20 based on a predetermined second condition by selecting the second mode.

The sequence selection step determines the sequence for stacking plural sheets (layers) so that the first sheet 20 (first layer 50) is stacked over a front side of the base sheet (base layer 50) and a second sheet 20 (second layer 50) is stacked over a front side of the first sheet 20 (first layer 50). The first condition includes specifying an outline of the first subpattern A or the second subpattern B on the first sheet 20 and specifying outlines of both the first subpattern A and the second subpattern B on the second sheet 20.

As a result, outlines of both the first subpattern A and the second sub pattern B are specified on the second sheet located relatively forward and an outline of either of the first subpattern A and the second sub pattern B are specified on the first sheet located relatively rearward. As a result, it is possible to generate cut data in which the subpatterns are combined so as to create a concaved pattern M by stacking the first sheet 20 and the second sheet 20 one after another in the listed sequence over the front side of the base sheet 20.

A frame line specifying step (step S17, control circuit 5 serving as a frame line specifying unit) specifies a frame line 41 on each of the plural sheets 20 (layers 50). The frame line 41 specified on each of the plural sheets 20 are identically shaped and encompasses the pattern M. In the cut data generating step, cut data is further generated for the frame line specified for each of the plural sheets.

Accordingly, frame lines 41 having the same outer bounds are formed on each sheet 20. Thus, the sheets may be stacked over one another without misalignment of the subpatterns by superimposing the outer bounds of the frame lines 41. It is thus, possible to create neat looking embellishments 51.

A matchmark specifying step (step S18, control circuit 5 serving as a matchmark specifying unit) specifies a matchmark for identifying an orientation of each of the plural sheets 20 (layers 50). The cut data generating step further generates cut data for cutting the matchmark specified for each of the plural sheets 20. Accordingly, the embellishments 51 may be readily created without misplacing the orientation of the sheets 20 when the sheets are stacked by simply aligning the matchmarks 42 of the sheets 20. The sequence selection step determines the sequence for stacking plural sheets (layers) so that the first sheet 20 (first layer 50) is stacked over a front side of the base sheet (base layer 50) and a second sheet 20 (second layer 50) is stacked over a front side of the first sheet 20 (first layer 50). The second condition includes specifying an outline of both the first subpattern A and the second subpattern B on the first sheet 20 and specifying an outline of either of the first subpattern A and the second subpattern B on the second sheet 20.

As a result, outlines of both the first subpattern A and the second sub pattern B are specified on the first sheet 20 located relatively rearward and an outline of either of the first subpattern A and the second sub pattern B are specified on the second sheet 20 located relatively forward. As a result, it is possible to generate cut data in which the subpatterns are combined so as to create a convexed pattern M by stacking the first sheet 20 and the second sheet 20 one after another in the listed sequence over the front side of the base sheet 20.

The outline specifying step (outline specifying unit) specifies an outline of at least either of the first subpattern A and the second subpattern B on the base sheet 20 (base layer 50). In the cut data generating step (cut data generating unit), cut data is generated for forming a perforated cut line for an outline of at least either of the first subpattern and the second subpattern specified on the base layer.

Accordingly, the perforated cut line 53 formed on the base sheet 20 serves as an alignment mark for aligning the first sheet 20 cut along an outline of at least either of the first subpattern A and a second subpattern B for example. It is thus, possible to accurately and easily align the first sheet 20 to the base sheet 20 by aligning the outer bounds of the first sheet 20 on the perforated cut line 53 of the base sheet 20. Though not illustrated, cut line data may be generated for forming a cut line cutting at least a portion of at least either of the first subpattern A and the subpattern B of the base sheet 20 instead of generating the perforated cut line 53. The cut line cutting a portion of one of the outlines will also serve as an alignment mark for aligning the first sheet 20 with the base sheet 20.

In the cut data generating step (cut data generating unit), when the first subpattern A and the second subpattern B specified on the first sheet 20 (first layer 50) in the outline specifying step (by the outline specifying unit) are located adjacent to one another, cut data is generated for forming a perforated cut line 54 as boundary lines C23 and C24 of the first subpattern and the second subpattern.

Accordingly, the perforated cut line 54 formed on the first sheet 20 serves as an alignment mark for aligning the second sheet 20 cut along an outline of at least either of the first subpattern A and a second subpattern B. It is thus, possible to accurately and easily align the second sheet 20 to the first sheet 20 by aligning the outer bounds of the second sheet 20 on the perforated cut line 54 of the first sheet 20. Though not illustrated, cut line data may be generated for forming a cut line cutting at least a portion of the boundary lines C23 and C24 of the first subpattern A and the second subpattern B instead of generating the perforated cut line 54. The cut line cutting a portion of the boundary lines C23 and C24 will also serve as an alignment mark for aligning the second sheet 20 with the first sheet 20.

The cut control device 11 of the first embodiment is provided with a control device, wherein the control device is configured to: acquire cut data containing first cut data and second cut data (acquiring unit, control circuit 25/control unit, and communication unit 111*b*); input instructions for selecting either of the first cut data or the second cut data (input unit, control circuit 25, and operation switches 16*b*);

and controlling the cutter to cut each of the sheets 20 along the outline of subpatterns (control circuit 25).

Accordingly, the outlines of the subpatterns are cut automatically by controlling the cutter through the control unit based on the selected cut data. It is further possible to easily create each sheet 20 of the embellishment 51 in which the pattern M is formed in a concave profile by selecting the first cut data and each sheet 20 of the embellishment 52 in which the pattern M is formed in a convex profile by selecting the second cut data.

Second Embodiment

FIGS. 13A to 14B illustrate a second embodiment and elements identical to those of the first embodiment are identified with identical reference symbols. Description is given hereinafter on the differences from the first embodiment. As illustrated in FIGS. 13A to 14B, a frame line 43 of the second embodiment is configured by a hexagonal outline for example. The cut data generation program may be provided with coordinate data for identifying the frame line 43 as an option or allow the user to specify the frame line 43 as the frame line of his/her preference. For example, at step S12 of the first data generation process (see FIG. 12), the control circuit 5 may invoke a frame line selection screen (not illustrated) for selecting a frame line from a choice of multiple types of frame lines including the hexagonal frame line 43 and the square frame line 41. The frame line may be circular, elliptical, formed of curved lines, or combination of straight and curved lines. When the user selects the frame line 43 using a mouse 4b etc. while viewing the frame line selection screen, the control circuit 5 sets the frame line 43 as the frame line to be applied to layers 50R to 50Y. The control circuit 5, the input unit 4 such as the mouse 4b, and the display 3 serve as a frame line specifying unit.

Thus, at step S17, cut line data associated with each of the sheets 20R to 20Y is generated based on vertexes $P_0$ to $P_6$ of the frame line 43 specified for each of the layers 50R to 50Y. The generated cut line data is provided with feed data, first coordinate data, second coordinate data, . . . , and sixth coordinate data corresponding to the cut start point $P_0$, vertex $P_1$, vertex $P_2$, and cut end point $P_6$.

Figure 13C:
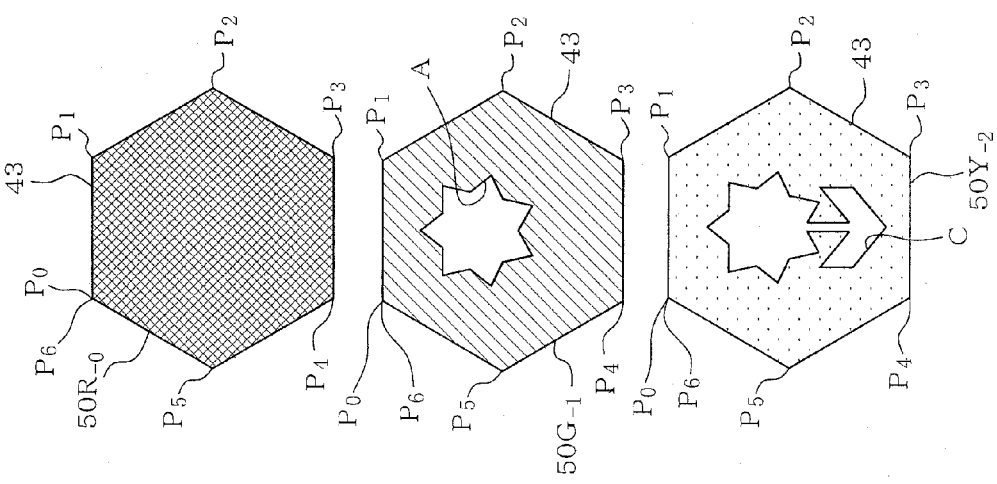
FIGS. 13A, 13B, and 13C pertain to a second embodiment and correspond to FIGS. 7A, 7B, and 7C.
Figure 13B:
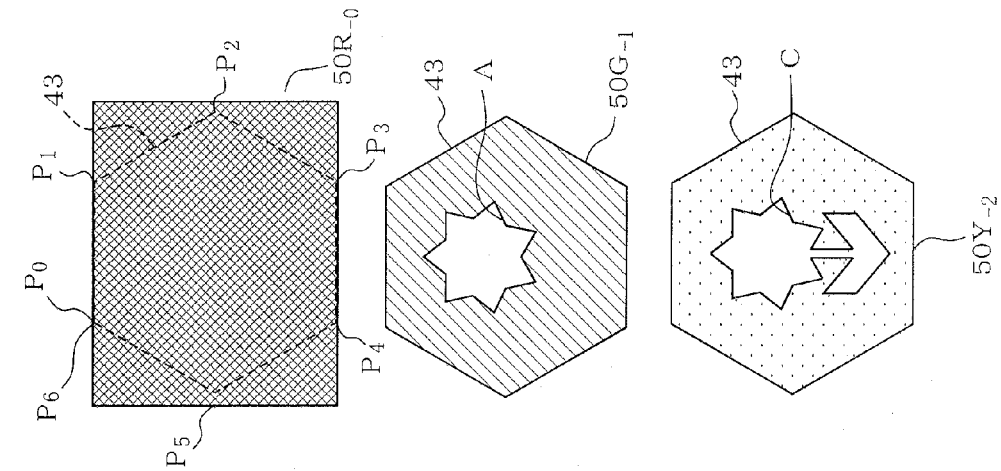
Figure 13A:
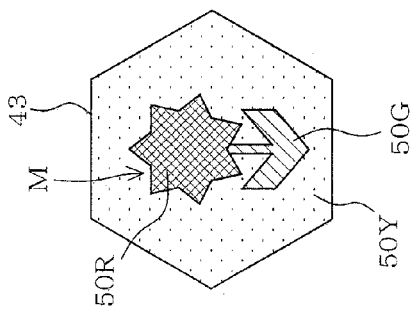

The first cut data generated by the first data generation process contains cut data capable of cutting the sheets 20R to 20Y corresponding to layers 50R to 50Y and illustrated in FIG. 13B along the frame lines 43. Thus, it is also possible in the second embodiment to set frame lines 43 having the same outer bounds for all of the sheets 20R to 20Y. Thus, the sheets 20 may be stacked over one another without misalignment of the subpatterns by superimposing the outer bounds of the cut sheets 20R to 20Y as illustrated in FIG. 13A. It is thus, possible to create neat looking embellishments 51 and obtain the effects similar to those of the first embodiment.

As illustrated in FIG. 13C, the frame line 43 may be set as a perforated cut line on the base layer 50R. In such case, a setting is to be made in the frame selection screen to remove the frame line 43 from the base sheet 20R alone. As a result, cut data associated with each of the sheets 20R to 20Y is formed based on the coordinate data of the frame line 43 specified for each of the layers 50R to 50Y at step S17. Further, an attribute flag for forming a perforated frame line 43 is appended to the cut data for base sheet 20R.

It is thus, possible to align the first sheet 20G with respect to the base sheet 20 by utilizing the perforated frame line 43 even if the outer bounds of the base sheet 20R is not the same as the outer bounds of sheets 20G and 20Y.

In the second data generation process (see FIG. 11), a process for setting the frame line may be added after step S31 for example. The frame line 43 may be selected from a choice of frame lines in the frame line selection screen as was the case in the first data generation process. Thus, the cut line data for the frame line 43 is generated with respect to the base layer 50Y when generating the cut line data for the alignment data 53 of the subpattern C formed at step S37. The generated second cut data contains cut data for cutting along the frame line 43 of base sheet 20Y associated with the layers 50R to 50Y illustrated in the longitudinal direction in FIG. 14B. Thus, various embellishments 52 having base sheets 20Y of different frame lines may be created (see FIG. 14A) apart from the embellishment 52 illustrated in FIG. 3B.

The present disclosure is not limited to the embodiments described above but may be implemented in various other embodiments within the spirit of the disclosure.

The cut data generating program of the first embodiment was configured to extract color information from the design image data. Alternatively, the first and second cut data may be generated without acquiring color information. The control circuit 5 is capable of specifying an outline to a subpattern for each of the sheets (layers) based on the vector data of the outlines extracted from the design image data and based on the predetermined first condition or the second condition in such alternative embodiment as well.

The matchmark 42 formed as a circular hole located at the corners of layers 50R to 50Y in FIG. 3B is merely an example and thus, may come in any form as long as the orientation of the corresponding sheets 20R to 20Y can be identified. For example, the matchmarks may be provided at a different location in the peripheral edges of the layers 50R to 50Y. The matchmark may be printed on the sheets 20R to 20Y by a pen cartridge not illustrated by attaching the pen catridge to a catridge holder 15a instead of using the cutter cartridge 14. Similarly, the perforated cut lines 53 and 54 serving as alignment lines may be printed on the sheets 20R to 20Y by the pen cartridge instead of being cut by the cutter of the cutter cartridge 14.

The cutting apparatus 11 described above is merely an example and thus, may be replaced by various types of devices having a cutting feature.

The cut data generating program may be stored in, but not limited to an EEPROM 8, etc. and may be stored in computer readable storing medium such as a USB memory, CD-ROM, a flexible disk, a DVD, a memory card, or the like. In such case, the computer readable storing medium may be read and executed through computers of various types of data processing devices to achieve the operation and effect similar to those of the foregoing embodiment.

In the embodiments described above, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

I claim:

1. A cut data generating device generating cut data comprising:
   a communication unit communicable with a cutting apparatus, the cutting apparatus including a platen receiving a sheet and a relative transfer unit moving the sheet and a cutter relative to each other based on the cut data thereby to cut the sheet by the cutter;
   a memory storing information of data indicating a design;
   a control device;
   wherein the cut data is used for creating an embellishment indicating a pattern formed by combining plural subpatterns of different shapes, the plural subpatterns being combined by stacking plural sheets cut along an outline of the plural subpatterns, and
   wherein the control device causes the cut data generating device to:
      extract outlines of plural subpatterns contained in the design, based on the data indicating the design stored in the memory;
      determine number of layers associated with number of the sheets with respect to the outlines of the plural subpatterns extracted;
      judge a containment relation between the outlines of the plural subpatterns extracted;
      determine a sequence for stacking plural layers so that when judging that an outline of one subpattern contains an outline of another pattern, a layer associated with a sheet for cutting the outline of the one subpattern is placed in front of a layer associated with a sheet for cutting the outline of the other pattern;
      associate the layers whose number have been determined with the outlines of the plural subpatterns based on the determined sequence and store the association in the memory;
      generate an integrated outline by integrating an outline of a first subpattern associated with a first layer which is one of the layers whose number have been determined with an outline of a second subpattern associated with a second layer whose sequence has been determined to be adjacent to the first layer and to be placed in front of the first layer, the integrated outline containing the first subpattern and the second subpattern and being integrated so that when the first and second subpatterns are located adjacent to one another, the first and second subpatterns are combined into a single figure by eliminating a connecting portion of the outlines of the first and second subpatterns;
      specify the outline of the first subpattern stored in the memory with association to the first layer on the first layer and further specify the integrated outline generated based on the outline of the first subpattern and the outline of the second subpattern on the second layer whose sequence has been determined to be placed in front of the first layer;
      generate cut data for cutting the outline of the first subpattern from a first sheet associated with the first layer and for cutting the integrated outline from which the first subpattern and the second subpattern are cut out from a second sheet associated with the second layer, based on the specified outline of the first subpattern and the specified integrated outline; and
      output the generated cut data via the communication unit to the cutting apparatus.

2. The cut data generating device according to claim 1, wherein the control device further causes the cut data generating device to:
   specify a frame line on each of the plural layers whose number has been determined, the frame line specified on each of the plural layers being identically shaped and encompassing the pattern and associated with an outer edge of the sheet, and
   generate cut data for the frame line specified for each of the plural layers, the cut data being associated with each of the plural sheets.

3. The cut data generating device according to claim 1, wherein the control device further causes the cut data generating device to:
   specify a matchmark for identifying an orientation of each of the plural sheets associated with each of the plural layers, and
   generate cut data for the matchmark specified for each of the plural layers, the cut data being associated with each of the plural sheets.

4. A non-transitory computer readable storing medium, storing computer readable instructions, wherein when executed by a control device of a cut data generating device generating cut data used for creating an embellishment indicating a pattern formed by combining plural subpatterns of different shapes and further used in a cutting apparatus including a platen receiving a sheet and a relative transfer unit moving the sheet and a cutter relative to each other based on the cut data, thereby cutting the sheet by a cutter, the plural subpatterns being combined by stacking plural sheets cut along an outline of the plural subpatterns, the cut data generating device including a communication unit communicable with an external unit and a memory storing information of data indicating a design, the instructions cause the control device to:
   extract outlines of plural subpatterns contained in the design, based on the data indicating the design stored in the memory;
   determine number of layers associated with number of the sheets with respect to the outlines of the plural subpatterns extracted;
   judge a containment relation between the outlines of the plural subpatterns extracted;
   determine a sequence for stacking plural layers so that when judging that an outline of one subpattern contains an outline of another pattern, a layer associated with a sheet for cutting the outline of the one subpattern is placed in front of a layer associated with a sheet for cutting the outline of the other pattern;
   associate the layers whose number have been determined with the outlines of the plural subpatterns based on the determined sequence and store the association in the memory;
   generate an integrated outline by integrating an outline of a first subpattern associated with a first layer which is one of the layers whose number have been determined with an outline of a second subpattern associated with a second layer whose sequence has been determined to be adjacent to the first layer and to be placed in front of the first layer, the integrated outline containing the first subpattern and the second subpattern and being integrated so that when the first and second subpatterns are located adjacent to one another, the first and second subpatterns are combined into a single figure by eliminating a connecting portion of the outlines of the first and second subpatterns;

specify the outline of the first subpattern stored in the memory with association to the first layer on the first layer and further specify the integrated outline generated based on the outline of the first subpattern and the outline of the second subpattern on the second layer whose sequence has been determined to be placed in front of the first layer;

generate cut data for cutting the outline of the first subpattern from a first sheet associated with the first layer and for cutting the integrated outline from which the first subpattern and the second subpattern are cut out from a second sheet associated with the second layer, based on the specified outline of the first subpattern and the specified integrated outline; and output the generated cut data via the communication unit to the external unit.

5. The medium according to claim 4, wherein the instructions further cause the control device to:

specify a frame line on each of the plural layers whose number has been determined, the frame line specified on each of the plural layers being identically shaped and encompassing the pattern and associated with an outer edge of the sheet, and generate cut data for the frame line specified for each of the plural layers, the cut data being associated with each of the plural sheets.

6. The medium according to claim 4, wherein the instructions further cause the control device to:

specify a matchmark for identifying an orientation of each of the plural sheets associated with each of the plural layers, and generate cut data for the matchmark specified for each of the plural layers, the cut data being associated with each of the plural sheets.

7. A method of generating cut data by use of a cut data generating device, the cut data being used for creating an embellishment indicating a pattern formed by combining plural subpatterns of different shapes, the cut data being used in a cutting apparatus including a platen receiving a sheet and a relative transfer unit moving the sheet and a cutter relative to each other based on the cut data, thereby cutting the sheet by a cutter, the plural subpatterns being combined by stacking plural sheets cut along an outline of the plural subpatterns, the cut data generating device including a communication unit communicable with an external unit and a memory storing information of data indicating a design, the method comprising:

extracting outlines of plural subpatterns contained in the design, based on the data indicating the design stored in the memory;

determining number of layers associated with number of the sheets with respect to the outlines of the plural subpatterns extracted;

judging a containment relation between the outlines of the plural subpatterns extracted;

determining a sequence for stacking plural layers so that when judging that an outline of one subpattern contains an outline of another pattern, a layer associated with a sheet for cutting the outline of the one subpattern is placed in front of a layer associated with a sheet for cutting the outline of the other pattern;

associate the layers whose number have been determined with the outlines of the plural subpatterns based on the determined sequence and store the association in the memory;

generating an integrated outline by integrating an outline of a first subpattern associated with a first layer which is one of the layers whose number have been determined with an outline of a second subpattern associated with a second layer whose sequence has been determined to be adjacent to the first layer and to be placed in front of the first layer, the integrated outline containing the first subpattern and the second subpattern and being integrated so that when the first and second subpatterns are located adjacent to one another, the first and second subpatterns are combined into a single figure by eliminating a connecting portion of the outlines of the first and second subpatterns;

specifying the outline of the first subpattern stored in the memory with association to the first layer on the first layer and further specifying the integrated outline generated based on the outline of the first subpattern and the outline of the second subpattern on the second layer whose sequence has been determined to be placed in front of the first layer;

generating cut data for cutting the outline of the first subpattern from a first sheet associated with the first layer and for cutting the integrated outline from which the first subpattern and the second subpattern are cut out from a second sheet associated with the second layer, based on the specified outline of the first subpattern and the specified integrated outline; and outputting the generated cut data via the communication unit to the external unit.

* * * * *